US010628972B2

(12) United States Patent
Lee et al.

(10) Patent No.: US 10,628,972 B2
(45) Date of Patent: Apr. 21, 2020

(54) DIAGNOSTIC IMAGING METHOD AND APPARATUS, AND RECORDING MEDIUM THEREOF

(71) Applicant: Samsung Electronics Co., Ltd., Suwon-si, Gyeonggi-do (KR)

(72) Inventors: Kyoung-yong Lee, Hwaseong-si (KR); Duhgoon Lee, Suwon-si (KR); Dong-gue Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 15/902,363

(22) Filed: Feb. 22, 2018

(65) Prior Publication Data

US 2018/0182130 A1 Jun. 28, 2018

Related U.S. Application Data

(62) Division of application No. 14/628,546, filed on Feb. 23, 2015, now Pat. No. 9,934,598.

(30) Foreign Application Priority Data

Feb. 24, 2014 (KR) .................... 10-2014-0021517

(51) Int. Cl.
*G06K 9/00* (2006.01)
*G06T 11/00* (2006.01)

(52) U.S. Cl.
CPC ........ *G06T 11/005* (2013.01); *G06T 2200/24* (2013.01); *G06T 2207/10081* (2013.01); *G06T 2207/20092* (2013.01); *G06T 2207/30004* (2013.01); *G06T 2211/40* (2013.01); *G06T 2211/412* (2013.01)

(58) Field of Classification Search
CPC ............................................ G06T 2207/30004
See application file for complete search history.

(56) References Cited

U.S. PATENT DOCUMENTS

| 5,848,114 A | 12/1998 | Kawai et al. |
| 6,370,217 B1 | 4/2002 | Hu et al. |
| 7,054,475 B2 | 5/2006 | Edic et al. |
| 7,630,472 B2 | 12/2009 | Tsuyuki et al. |

(Continued)

FOREIGN PATENT DOCUMENTS

| CN | 1907227 | 2/2007 |
| CN | 101313334 | 11/2008 |

(Continued)

OTHER PUBLICATIONS

Extended European Search Report dated Apr. 20, 2018 in European Patent Application No. 15751418.3.

(Continued)

*Primary Examiner* — Oneal R Mistry
(74) *Attorney, Agent, or Firm* — Staas & Halsey LLP

(57) ABSTRACT

A diagnostic imaging apparatus includes an image acquiring unit acquiring a first image obtained by imaging an object in a first section of a first cycle and a second image obtained by imaging the object in a second section, which corresponds to the first section, of a second cycle, and an image reconstruction unit reconstructing the first image and the second image based on a difference between the first image and the second image.

16 Claims, 17 Drawing Sheets

(56) References Cited

U.S. PATENT DOCUMENTS

| | | | |
|---|---|---|---|
| 7,912,321 B1 | 3/2011 | Simonson | |
| 8,184,883 B2 | 5/2012 | Grass et al. | |
| 2006/0159220 A1* | 7/2006 | Heuscher | A61B 6/032 378/9 |
| 2007/0030946 A1 | 2/2007 | Tsuyuki | |
| 2008/0009705 A1* | 1/2008 | Furudate | A61B 5/055 600/410 |
| 2009/0018435 A1 | 1/2009 | Hsieh | |
| 2009/0141935 A1 | 6/2009 | Grass | |
| 2009/0310844 A1 | 12/2009 | Ludwig | |
| 2010/0195889 A1 | 8/2010 | Allmendinger | |
| 2010/0208957 A1 | 8/2010 | Chen | |
| 2011/0142313 A1 | 6/2011 | Pack et al. | |
| 2011/0243419 A1* | 10/2011 | Allmendinger | A61B 6/503 382/131 |
| 2011/0293159 A1* | 12/2011 | Bruder | A61B 6/032 382/131 |
| 2012/0039435 A1 | 2/2012 | Arai | |
| 2013/0156282 A1* | 6/2013 | Noda | G06T 5/20 382/131 |
| 2013/0261445 A1* | 10/2013 | Ertel | A61B 5/0044 600/431 |
| 2014/0044329 A1 | 2/2014 | Veerman et al. | |
| 2014/0086383 A1* | 3/2014 | Huwer | A61B 6/505 378/5 |
| 2014/0376795 A1 | 12/2014 | Lamash | |
| 2015/0356756 A1 | 12/2015 | Okamoto | |

FOREIGN PATENT DOCUMENTS

| | | |
|---|---|---|
| EP | 3107457 | 12/2016 |
| JP | 8-79628 | 3/1996 |
| JP | 9-253079 | 9/1997 |
| JP | 2000-189412 | 7/2000 |
| JP | 2009-165518 | 7/2009 |
| WO | 2013/097877 | 7/2013 |
| WO | 2013/121312 | 8/2013 |

OTHER PUBLICATIONS

Roshni Bhagalia et al., "Nonrigid registration-based coronary artery motion correction for cardiac computed tomography", XP012161128, Medical Physics, vol. 39, No. 7, Jun. 2012, pp. 4245-4254.

H. Bruder et al., "Can Motion Compensated Reconstruction Improve 'Best Phase' Reconstruction in Cardiac CT?", XP055465311, Proceedings of the SPIE, vol. 8668, 2013, 12 pages.

U.S. Office Action dated Apr. 6, 2016 in U.S. Appl. No. 14/628,546.
U.S. Office Action dated Jun. 24, 2016 in U.S. Appl. No. 14/628,546.
U.S. Office Action dated Oct. 27, 2016 in U.S. Appl. No. 14/628,546.
U.S. Office Action dated Feb. 27, 2017 in U.S. Appl. No. 14/628,546.
U.S. Office Action dated Jun. 13, 2017 in U.S. Appl. No. 14/628,546.
U.S. Notice of Allowance dated Nov. 22, 2017 in U.S. Appl. No. 14/628,546.

International Search Report and Written Opinion of the International Searching Authority dated May 27, 2015 in International Patent Application No. PCT/KR2015/001732.

Bernd Ohnesorge et al., "Principles of Multi-slice Cardiac CT Imaging", Chapter 4, 2007, pp. 71-126.

Korean Notice of Allowance dated Sep. 17, 2015 in Korean Patent Application No. 10-2014-0021517.

Korean Office Action dated Mar. 20, 2015 in Korean Patent Application No. 10-2014-0021517.

U.S. Appl. No. 14/628,546, filed Feb. 23, 2015, Kyoung-yong Lee, Samsung Electronics Co., Ltd.

Chinese Office Action dated Jul. 30, 2019 in Chinese Patent Application No. 201580021398.X.

* cited by examiner

FIG. 16A
FIG. 16B
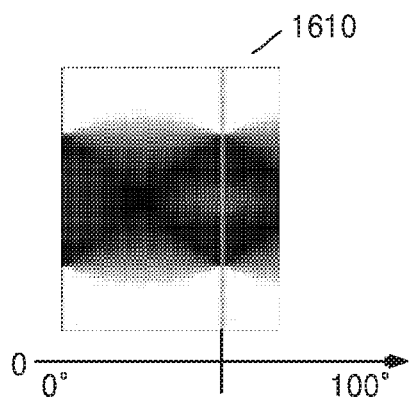
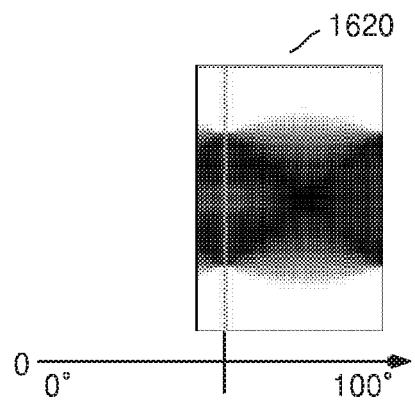
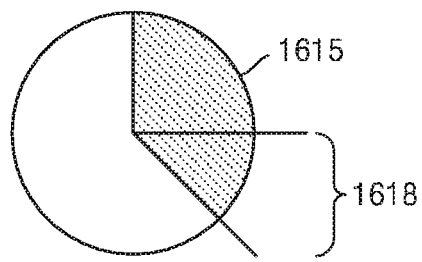
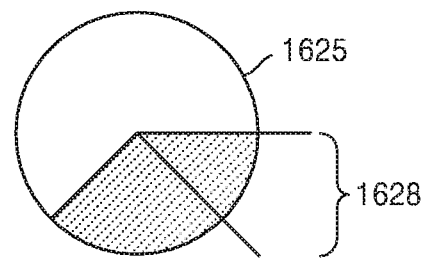

DIAGNOSTIC IMAGING METHOD AND APPARATUS, AND RECORDING MEDIUM THEREOF

CROSS-REFERENCE TO RELATED APPLICATIONS

This application is a divisional application of U.S. patent application Ser. No. 14/628,546, filed on Feb. 23, 2015, which claims the priority benefit of Korean Patent Application No. 10-2014-0021517, filed on Feb. 24, 2014, in the Korean Intellectual Property Office, the disclosures of which are incorporated herein in its entirety by reference.

BACKGROUND

1. Field

The following description relates to a diagnostic imaging method and apparatus, and a recording medium thereof.

2. Description of the Related Art

Diagnostic imaging equipment, which is high-tech equipment used for diagnosing various diseases of the human body, generally includes a magnetic resonance imaging (MRI) apparatus, a computer tomography (CT) apparatus, etc.

When an object is imaged by using diagnostic imaging equipment, generally, the object is repeatedly imaged for many cycles. In this case, if movements of the object are not constant, a plurality of images of the object, which are acquired as a result of the repeated imaging, may not match one another. When an image of the object is reconstructed based on the images that do not match one another, the accuracy of a reconstructed image may be deteriorated. Because accurate reconstruction is needed for diagnosing the human body, if the accuracy of a reconstructed image is deteriorated, there may be difficulties in the diagnosis of the object.

SUMMARY

One or more embodiments of the disclosure include a diagnostic imaging method and apparatus which may provide technology to more accurately reconstruct an image of an object during imaging for diagnosing diseases, and a recording medium thereof.

Additional aspects will be set forth in part in the description which follows and, in part, will be apparent from the description, or may be learned by practice of the presented embodiments.

According to one or more embodiments of the disclosure, a diagnostic imaging apparatus includes an image acquiring unit acquiring a first image obtained by imaging an object in a first section of a first cycle and a second image obtained by imaging the object in a second section, which corresponds to the first section, of a second cycle, and an image reconstruction unit reconstructing the first image and the second image based on a difference between the first image and the second image.

According to one or more embodiments of the disclosure, a diagnostic imaging apparatus includes an image acquiring unit acquiring first projection data obtained by imaging an object in a first section of a first cycle and second projection data obtained by imaging the object in a second section, which corresponds to the first section, of a second cycle, and an image reconstruction unit reconstructing an image of the object based on a difference between the first image and the second image.

According to one or more embodiments of the disclosure, a diagnostic imaging method includes acquiring a first image obtained by imaging an object in a first section of a first cycle, acquiring a second image obtained by imaging the object in a second section, which corresponds to the first section, of a second cycle, and reconstructing the first image and the second image based on a difference between the first image and the second image.

According to one or more embodiments of the disclosure, a diagnostic imaging method includes acquiring a first projection data obtained by imaging an object in a first section of a first cycle, acquiring a second projection data obtained by imaging the object in a second section, which corresponds to the first section, of a second cycle, and reconstructing an image of the object based on a difference between the first projection data and the second projection data.

BRIEF DESCRIPTION OF THE DRAWINGS

These and/or other aspects will become apparent and more readily appreciated from the following description of the embodiments, taken in conjunction with the accompanying drawings in which:

FIGS. 16A and 16B illustrate the projection data of sections where angles at which the object is imaged are identical to each other, according to an embodiment.

DETAILED DESCRIPTION

Figure 1:
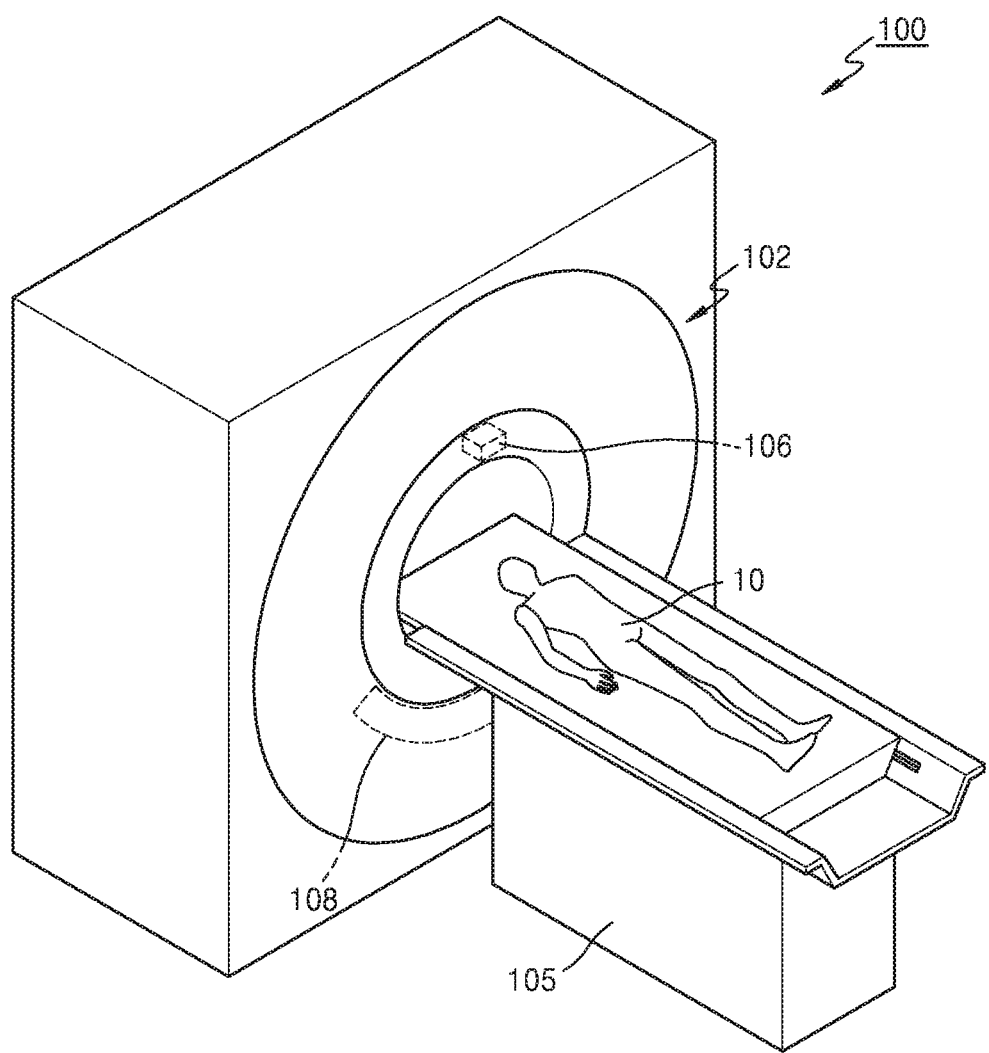
FIG. 1 schematically illustrates a general computed tomography (CT) system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, expressions such as "at least one of," when preceding a list of elements, modify the entire list of elements and do not modify the individual elements of the list.

The attached drawings for illustrating embodiments of the disclosure are referred to in order to gain a sufficient understanding of the disclosure, the merits thereof, and the objectives accomplished by the implementation of the disclosure. The disclosure may, however, be embodied in many different forms and should not be construed as being limited to the embodiments set forth herein; rather, these embodiments are provided such that this disclosure will be thorough and complete, and will fully convey the concept of the disclosure to one of ordinary skill in the art. Like reference numerals refer to like elements throughout the specification.

Hereinafter, the terms used in the specification will be briefly defined, and the embodiments will be described in detail.

The terms used in this specification are those general terms currently widely used in the art in consideration of functions regarding the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

When a part "includes" or "comprises" an element, unless there is a particular description contrary thereto, the part can further include other elements, not excluding the other elements. Also, the term "unit" in the embodiments of the disclosure refers to a software component or hardware component such as a field-programmable gate array (FPGA) or an application-specific integrated circuit (ASIC), and performs a specific function. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, databases, data structures, tables, arrays, or variables. A function provided by the components and "units" may be associated with a smaller number of components and "units", or may be divided into additional components and "units".

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail not to obscure the embodiments with unnecessary detail.

Throughout the specification, an "image" may refer to multi-dimensional data formed of discrete image elements, e.g., pixels in a two-dimensional (2D) image and voxels in a three-dimensional (3D) image. For example, the image may include a medical image of an object, which is captured by a computed tomography (CT) imaging apparatus.

Throughout the specification, a "CT image" may refer to an image generated by synthesizing a plurality of X-ray images that are obtained by imaging an object while a CT imaging apparatus rotates around at least one axis with respect to the object.

Furthermore, in the present specification, an "object" may be a human, an animal, or a part of a human or animal. For example, the object may be an organ (e.g., the liver, the heart, the womb, the brain, a breast, or the abdomen), a blood vessel, or a combination thereof. Furthermore, the "object" may be a phantom. The phantom refers to a material having a density, an effective atomic number, and a volume that are approximately the same as those of an organism. For example, the phantom may be a spherical phantom having properties similar to the human body.

Throughout the specification, a "user" may be, but is not limited to, a medical professional including a medical doctor, a nurse, a medical laboratory technologist, a medical image expert, or a technician who repairs a medical apparatus, for example.

Because a CT system is capable of providing a cross-sectional image of an object, the CT system may distinctively indicate an inner structure, e.g., an organ such as a kidney or a lung, of the object, compared to a general X-ray imaging apparatus.

The CT system may obtain a plurality of pieces of image data with a thickness not more than 2 mm, several tens to several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as follows:

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using a VR method or an SSD method.

Multi-planar reformation (MPR)—a method of reconstructing an image into a different cross-sectional image. A user may reconstruct an image in any desired direction.

Editing—a method of editing adjacent voxels to allow a user to easily observe an area of interest in volume rendering.

Voxel of interest (VOI)—a method of displaying only a selected area in volume rendering.

A CT system 100 according to an embodiment of the disclosure will now be described with reference to FIG. 1. The CT system 100 may include various types of devices.

FIG. 1 schematically illustrates the CT system 100. Referring to FIG. 1, the CT system 100 may include a gantry 102, a table 105, an X-ray generating unit, or generator, 106, and an X-ray detecting unit, or detector, 108.

The gantry 102 may include the X-ray generating unit 106 and the X-ray detecting unit 108.

An object 10 may be positioned on the table 105.

The table 105 may move in a predetermined direction (e.g., at least one of up, down, right, and left directions) during a CT imaging procedure. Also, the table 105 may tilt or rotate by a predetermined angle in a predetermined direction.

Figure 2:
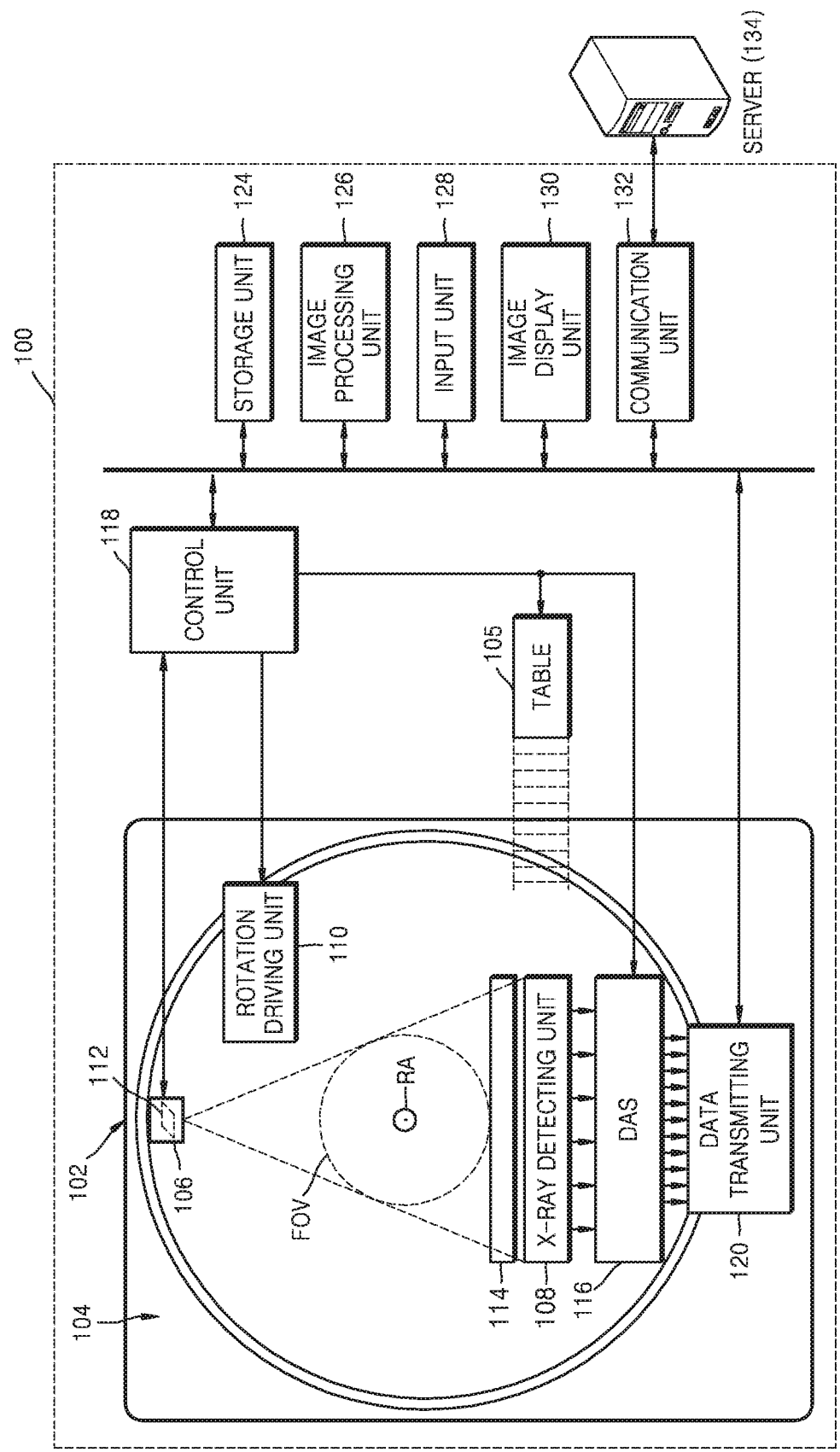
FIG. 2 is a block diagram illustrating a structure of the CT system.

FIG. 2 is a block diagram illustrating a structure of the CT system 100.

The CT system 100 may include the gantry 102, the table 105, a control unit 118, a storage unit 124, a CT image processing unit 126, an input unit, or input, 128, a CT image display unit, or display, 130, and a communication unit, or communicator, 132.

As described above, the object 10 may be positioned on the table 105. In the embodiment, the table 105 may move in a predetermined direction (e.g., at least one of up, down, right, and left directions), and the control unit, or controller, 118 may control movement of the table 105.

The gantry 102 may include a rotating frame 104, the X-ray generating unit 106, the X-ray detecting unit 108, a rotation driving unit, or driver, 110, a data acquisition system (DAS) 116, and a data transmitting unit, or transmitter, 120.

The rotating frame 104 included in the gantry 102 may have a loop shape capable of rotating with respect to a predetermined rotation axis RA. Also, the rotating frame 104 may have a disc shape.

The X-ray generating unit 106 and the X-ray included in the rotating frame 104 may be arranged to face each other to have a predetermined field of view (FOV). The rotating frame 104 may also include an anti-scatter grid 114. The anti-scatter grid 114 may be positioned between the X-ray generating unit 106 and the X-ray detecting unit 108.

In a medical imaging system, X-ray radiation that reaches a detector (or a photosensitive film) includes not only attenuated primary radiation that forms a valuable image but also scattered radiation that deteriorates the quality of an image. In order to transmit most of the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, the formation of the anti-scatter grid 114 is not limited thereto.

The rotating frame 104 may receive a driving signal from the rotation driving unit 110 and may rotate the X-ray generating unit 106 and the X-ray detecting unit 108 at a predetermined rotation speed. The rotating frame 104 may receive the driving signal and power from the rotation driving unit 110 while the rotating frame 104 contacts the rotation driving unit 110 via a slip ring (not shown). Also, the rotating frame 104 may receive the driving signal and power from the rotation driving unit 110 via wireless communication.

The X-ray generating unit 106 may receive a voltage and current from a power distribution unit, or distributor, (PDU) (not shown) via a slip ring (not shown), and then, a high voltage generating unit, or generator, (not shown) may generate and emit an X-ray. When the high voltage generating unit applies predetermined voltage (hereinafter, referred to as a tube voltage) to the X-ray generating unit 106, the X-ray generating unit 106 may generate X-rays having a plurality of energy spectra that correspond to the tube voltage.

The X-ray generated by the X-ray generating unit 106 may be emitted in a predetermined form due to a collimator 112.

The X-ray detecting unit 108 may be positioned to face the X-ray generating unit 106. Each X-ray detecting device may establish one channel but one or more embodiments of the disclosure are not limited thereto.

The X-ray detecting unit 108 may detect the X-ray that is generated by the X-ray generating unit 106 and that is transmitted through the object 10, and may generate an electrical signal corresponding to an intensity of the detected X-ray.

The X-ray detecting unit 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detecting unit 108. Electrical signals generated by the X-ray detecting unit 108 may be collected by wire or wirelessly by the DAS 116. Also, the electrical signals generated by the X-ray detecting unit 108 may be provided to an analog-to-digital converter (not shown) via an amplifier (not shown).

According to a slice thickness or the number of slices, only some pieces of data collected by the X-ray detecting unit 108 may be provided to the CT image processing unit 126 via the data transmitting unit 120, or the CT image processing unit 126 may select only some of the pieces of data.

Such a digital signal may be provided to the CT image processing unit 126 via the data transmitting unit 120. The digital signal may be provided to the CT image processing unit 126 by wire or wirelessly.

The control unit 118 may control an operation of each of the elements in the CT system 100. For example, the control unit 118 may control operations of the table 105, the rotation driving unit 110, the collimator 112, the DAS 116, the storage unit 124, the CT image processing unit 126, the input unit 128, the CT image display unit 130, the communication unit 132, or the like.

The CT image processing unit 126 may receive data acquired by the DAS 116 (e.g., raw data that is data before processing), via the data transmitting unit 120, and may perform pre-processing on the received data.

The pre-processing may include, for example, a process of correcting a sensitivity irregularity between channels and a process of correcting signal loss due to a rapid decrease in signal intensity or due to the presence of an X-ray absorbing material such as metal.

Data output from the CT image processing unit 126 may be referred to as raw data or projection data. The projection data may be stored in the storage unit 124 with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all channels at the same imaging angle is referred to as a projection data set.

The storage unit 124 may include at least one storage medium from among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The CT image processing unit 126 may reconstruct a cross-sectional image of the object 10 by using the acquired projection data set. The cross-sectional image may be a 3D image. In other words, the CT image processing unit 126 may reconstruct a 3D image of the object 10 by using a cone beam reconstruction method or the like, based on the acquired projection data set.

The input unit 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of an FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input unit 128 may include a device for receiving a predetermined input from an external source. For example, the input unit 128 may include a microphone, a keyboard, a mouse, a joystick, a touch pad, a touch pen, a voice recognition device, a gesture recognition device, or the like.

The CT image display unit 130 may display an X-ray image reconstructed by the CT image processing unit 126.

Exchanges of data, power, or the like between the aforementioned elements may be performed by using at least one of wired communication, wireless communication, and optical communication.

The communication unit 132 may perform communication with an external device, an external medical apparatus, etc. via a server 134 or the like.

Figure 3:
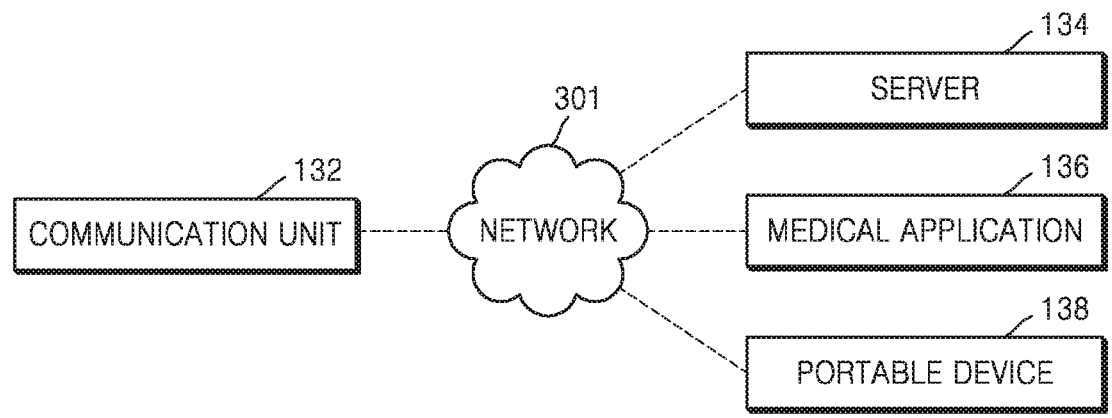
FIG. 3 is a block diagram illustrating a structure of a communication unit.

FIG. 3 is a block diagram illustrating the communication performed by the communication unit 132.

The communication unit 132 may be connected to the network 301 by wire or wirelessly and therefore may perform communication with the server 134, the medical apparatus 136, or the portable device 138. The communication module 132 may exchange data with a hospital server or another medical apparatus in a hospital, which may be connected thereto via PACS.

Also, the communication unit 132 may perform data communication with the portable device 138 or the like, according to the digital imaging and communications in medicine (DICOM) standard.

The communication unit 132 may transmit and receive data related to diagnosing the object 10, via the network 301. Also, the communication unit 132 may transmit and receive a medical image obtained from the medical apparatus 136 such as a magnetic resonance imaging (MRI) apparatus, an X-ray apparatus, or the like.

Furthermore, the communication unit 132 may receive a diagnosis history or a medical treatment schedule about a patient from the server 134 and may use the diagnosis history or the medical treatment schedule to diagnose the patient. Also, the communication unit 132 may perform data communication not only with the server 134 or the medical apparatus 136 in a hospital but also with the portable device 138 of a user or patient.

Also, the communication unit 132 may transmit information about a device error, information about a quality control status, or the like to a system manager or a service manager via the network 301, and may receive feedback regarding the information about a quality control status from the system manager or service manager.

Figure 4:
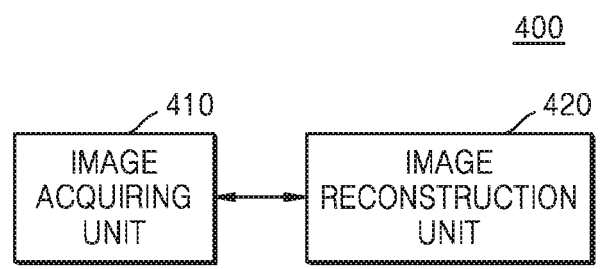
FIGS. 4 and 5 are block diagrams of a diagnostic imaging apparatus according to an embodiment.
Figure 5:
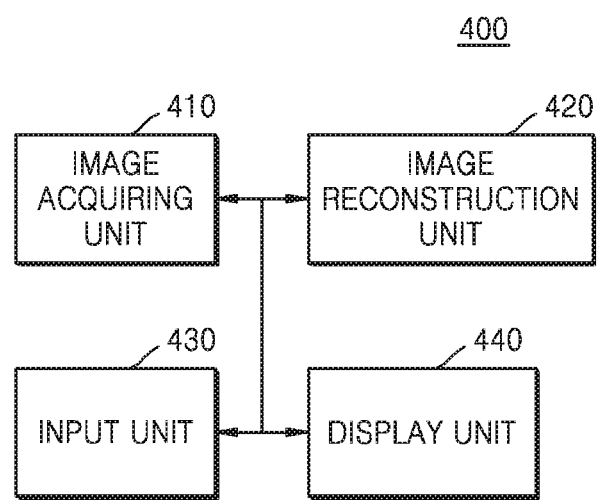

FIGS. 4 and 5 are block diagrams of a diagnostic imaging apparatus 400 according to an embodiment.

As illustrated in FIG. 4, the diagnostic imaging apparatus 400 according to the present embodiment includes an image acquiring unit 410 and an image reconstruction unit 420.

Also, in addition to the image acquiring unit 410 and the image reconstruction unit 420, the diagnostic imaging apparatus 400 may further include an input unit 430, and a display unit 440. However, all of the illustrated elements are not essential elements. The diagnostic imaging apparatus 400 may be embodied with more or less elements than the ones shown.

The diagnostic imaging apparatus 400 may be included in the CT system 100 or may be outside the CT system 100.

The above elements are described below in sequence.

The image acquiring unit 410 acquires a first image obtained by imaging an object in a first section of a first cycle. The first image may be a CT image. Also, the first image may be an image reconstructed from the projection data of the object. In the following description, the object may be a heart for convenience of description.

In the CT imaging, the object is imaged while the rotating frame 104 rotates around a predetermined rotation axis. A CT image may be a cross-sectional image of the object that is generated based on a data value corresponding to the intensity of an X-ray that has passed through the object as a result of the irradiation of the X-ray onto the object. An angle with the predetermined rotation axis, which is formed as the rotating frame 104 rotates to image the object, may be referred to as an "imaging angle".

In order to reconstruct an image of the object, projection data acquired as a result of the imaging of the object by the rotating frame 104 in an angular section exceeding 180° may be necessary. In general, the projection data acquired as a result of the imaging of the object by the rotating frame 104 in an angular section of a sum of 180° and a fan angle may be necessary. For example, when the fan angle is 60°, the projection data acquired as a result of the imaging of the object by the rotating frame 104 in an angular section of a total of 240° may be necessary.

The projection data set may be obtained by the CT image processing unit 126 as described above. The CT image processing unit 126 may generate the projection data based on the X-ray intensity data obtained by the X-ray detection unit 108 included in the rotating frame 104. The X-ray intensity data may be an index indicating the amount of the X-ray passing through the object. Also, the CT image processing unit 126 may generate a cross-sectional image of the object by using the projection data.

The image acquiring unit 410 may acquire the first image that is reconstructed from first projection data by the CT image processing unit 126. The first projection data may be a data value corresponding to the intensity of the X-ray that is radiated onto the object in the first section of the first cycle.

Also, the image acquiring unit 410 acquires a second image obtained by imaging the object in a second section, which corresponds to the first section, of a second cycle. The second section corresponding to the first section may be a section that has the same position in the second cycle as that of the first section of the first cycle. For example, when the first section starts 0.1 seconds after the pressure in the heart becomes the highest in the first cycle, the second section may be a section that starts 0.1 seconds after the pressure in the heart becomes the highest in the second cycle.

The image acquiring unit 410 may acquire the second image that is reconstructed from second projection data among the projection data to reconstruct the object, by the CT image processing unit 126 of the CT system 100. However, this is a mere embodiment and the image acquiring unit 410 may acquire an image reconstructed from at least one of the pieces of projection data of the object in addition to the first image and the second image. The CT system 100 may determine the number of pieces of projection data to be imaged before imaging the object, by taking into account the heartbeat rate per minute of the object. For example, the CT system 100 may acquire four images by reconstructing four pieces of projection data, by taking into account the heartbeat rate per minute of the object.

In order to acquire a reconstructed image of an object based on a plurality of images, an angular section where the object is imaged exceeds a total of 180°. In general, a plurality of images reconstructed based on a plurality of pieces of projection data that are acquired as a result of the imaging of the object by the rotating frame 104 in a section of a sum of 180° and a fan angle may be necessary. In the following description, a sum of the respective angular sections where the first projection data and the second projection data are imaged exceeds a value of the sum of 180° and the fan angle. However, this is a mere embodiment and the disclosure is not limited thereto.

The image reconstruction unit 420 reconstructs the first image and the second image based on a difference between the first image and the second image. The image reconstruction unit 420 according to the present embodiment may change a position of at least one of the first image and the second image. Although the first image and the second image are images of the heart that regularly moves, the images may not match each other because there may be a difference in the movement of the heart in each cycle. For example, positions of the coronary arteries, the atrium, the ventricle, and the myocardium of the heart may be different in each of the first image and the second image.

The image reconstruction unit 420 may acquire a more accurate reconstructed image of the object by adjusting a difference between the first image and the second image and combining the first image with the second image. The image reconstruction unit 420 may extract information about a movement between the first image and the second image and reconstruct an image of the object based on the extracted movement information. The image reconstruction unit 420 may change information about the position, size, and the shape of an image based on the movement information. The image reconstruction unit 420 according to the present embodiment may change the position of at least one of the first image and the second image to adjust the difference between the first image and the second image. For example, the image reconstruction unit 420 may change the position of at least one of the first image and the second image based on the object that is commonly included in the first image and the second image. In the following description, a method of changing the position of an image based on the commonly included object, which is performed by the image reconstruction unit 420, is described in detail with reference to FIG. 9.

Figure 9:
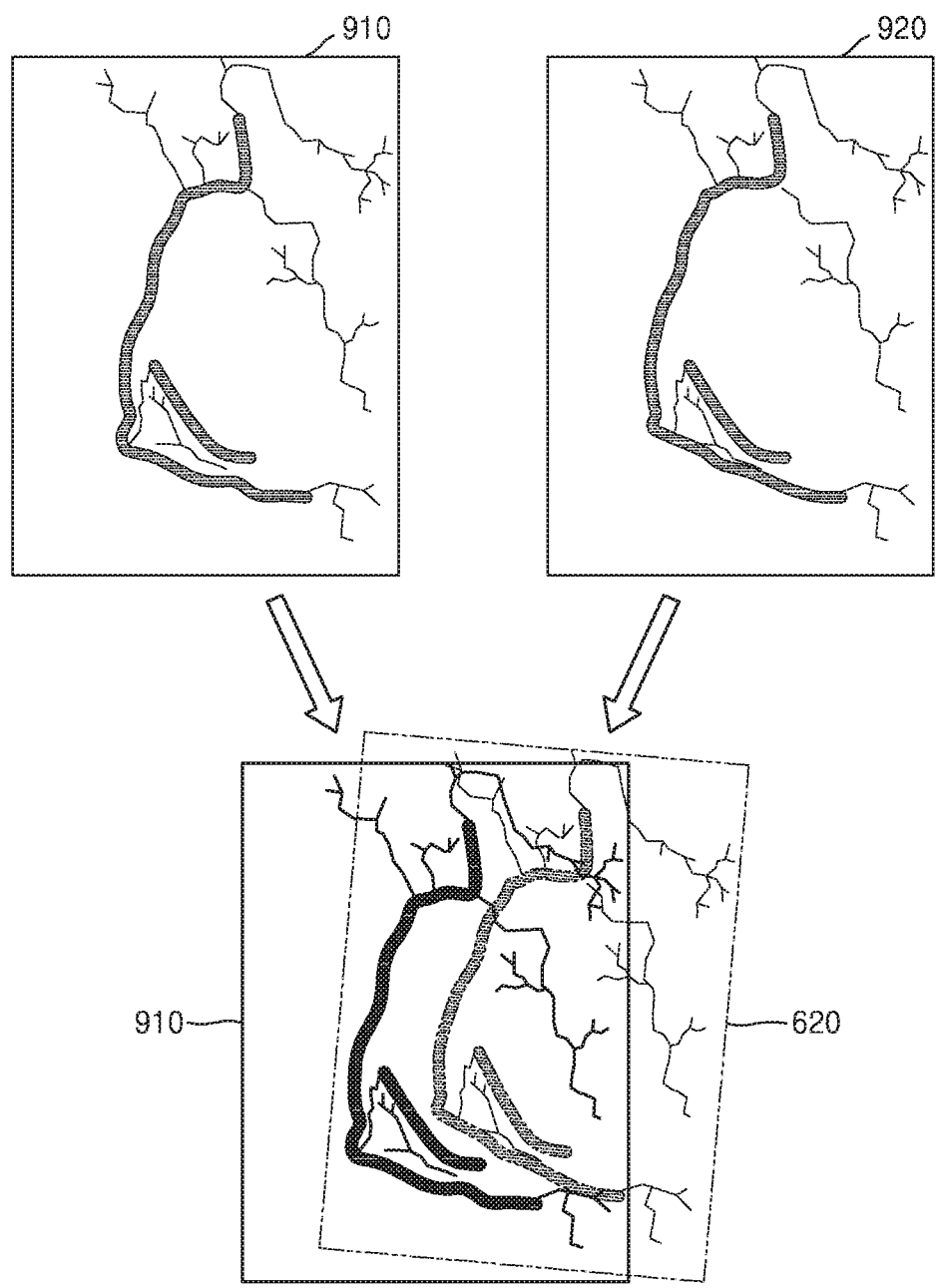
FIG. 9 illustrates a method of changing at least one of a first image and a second image, which is performed by a diagnostic imaging apparatus, according to an embodiment.

FIG. 9 illustrates a method of changing at least one of a first image 910 and a second image 920, which is performed by the diagnostic imaging apparatus 400, according to the present embodiment.

Referring to FIG. 9, it may be seen that, although the first image 910 and the second image 920 acquired by the diagnostic imaging apparatus 400 are the same images of the heart, the positions of the coronary arteries in the respective images are different from each other. This is because the movement of the heart is not constant in each cycle.

As the diagnostic imaging apparatus 400 according to the present embodiment changes the information about the position, size, and shape of the second image 920 with respect to the first image 910, a mismatch in the images of the object that may be generated because the movement of the heart is not constant in each cycle may be removed. In order to change the position of the second image 920, the diagnostic imaging apparatus 400 may determine the object that is commonly included in the first image 910 and the second image 920. Referring to FIG. 9, the diagnostic imaging apparatus 400 may determine the object that is commonly included in the first image 910 and the second image 920 as the coronary arteries. The diagnostic imaging apparatus 400 may change the second image 910 such that the position, size, and shape of the coronary arteries in the first image 910 may match those of the coronary arteries in the second image 920. The above changing method may include, for example, expanding, contracting, moving, or rotating an image.

However, this is a mere embodiment and the disclosure is not limited thereto. For example, in addition to the coronary arteries, the diagnostic imaging apparatus 400 may determine other objects such as the atrium, the ventricle, and the myocardium of the heart as the object that is commonly included in the first image 910 and the second image 920. For example, the diagnostic imaging apparatus 400 may select one of the coronary arteries, the atrium, the ventricle, and the myocardium of the heart, which has a clearer edge than others in the image, and determine the selected one as the object that is commonly included in each image. Also, the diagnostic imaging apparatus 400 may change all images without changing any one image only. For example, the diagnostic imaging apparatus 400 may change the first image 910 and the second image 920 by employing the changing method of expanding, contracting, horizontally moving, or rotating both images.

When three or more images of the object exist, the diagnostic imaging apparatus 400 may determine the object that is commonly included in each of a plurality of images in the same method as that applied to the first image 910 and the second image 920. The diagnostic imaging apparatus 400 may change at least one of a plurality of images such that the position, size, and shape of the object that is commonly included in each of the images may match one another, by comparing the positions of the commonly included object.

Alternatively, the image reconstruction unit 420 may adjust a difference between images based on information about a movement between the images, in addition to the method of determining a common object between images and adjusting the difference between the images based on the common object.

The image reconstruction unit 420 may extract information about a movement of the other image based on any one of the first image 910 and the second image 920. The image reconstruction unit 420 may change the other image based on the extracted movement information. For example, the image reconstruction unit 420 may change at least one of the position, size, and shape of the other image based on the extracted movement information. The movement information may be, for example, a motion vector of the other image based on any one image. In order to increase similarity between the first image 910 and the second image 920, the motion vector may include information about the direction and value of the other image moving based on any one of the first image 910 and the second image 920.

The image reconstruction unit 420 may move any one image based on the motion vector such that the similarity may be over a reference value. The similarity may be determined based on a result of comparing shading information between the first image 910 and the second image 920. For example, the image reconstruction unit 420 may compare shading information between images in units of pixels forming each image. Also, the shading information may be an image signal value at a pixel, in detail, a brightness value of an image at a predetermined pixel. The image brightness value may be determined based on the amount of an X-ray passing through the object. Also, the reference value may denote a similarity value between two images that are determined to have the same shading information value. For example, when the similarity between two images that are identical to each other is 100%, the reference value may be set to be 90%.

In the above-described example, the image reconstruction unit 420 may compare a brightness value of each pixel between the first image 910 and the second image 920, and change the position of the second image 920 based on the first image 910 such that a rate of pixels having the same brightness value is 90% or more in the whole image.

Alternatively, because the comparison of the shading information between images in units of pixels by the image reconstruction unit 420 is a mere embodiment, the shading information between images may be compared in units of blocks that are sets of pixels, or in units of regions that are previously set in the images.

The image reconstruction unit 420 may reconstruct an image of the object by summing the pixel values respectively forming the first image 910 and the second image 920, the difference of which is adjusted. The pixel value may include the shading information that is generated as a result of the imaging of the object. The image reconstruction unit 420 may sum the pixel values by applying a weight to each of the shading information of pixels forming the first image 910 and the shading information of pixels forming the second image 920. For example, when the accuracy of the second image 920 is determined to be higher than that of the first image 910, the summing may be performed by increasing the weight value applied to the second image 920. The accuracy of the second image 920 may be determined based on a scope of the angular section for imaging or similarity with an existing material stored in a database.

In the above-described example, the image reconstruction unit 420 may sum a value obtained by multiplying a weight of 0.3 applied to the pixel value of the first image 910 and a weight of 0.7 applied to the pixel value of the second image 920.

Also, the image reconstruction unit 420 may sum the pixel values of the first image and the second image by increasing the weight of an image that is determined to be more accurate for each pixel of each image. For example, while the pixel value of one half of an image may be obtained by summing a value obtained by multiplying a weight of 0.7 to the pixel value of the first image and a value obtained by multiplying a weight of 0.3 to the pixel value of the second image, the pixel value of the other half of the image may be obtained by summing a value obtained by multiplying a weight of 0.4 to the pixel value of the first image and a value obtained by multiplying a weight of 0.6 to the pixel value of the second image.

However, this is a mere embodiment and all existing methods used to match a plurality of images may be employed therefore. The image reconstruction unit 420 may select a method of reconstructing an image based on similarity between a plurality of acquired images.

The image reconstruction unit 420 according to the present embodiment may acquire at least one image obtained by imaging the object in each section corresponding to the first section of at least one of other cycles. For example, the image reconstruction unit 420 may acquire an image of a section corresponding to the first section from an image obtained by imaging the object in a third cycle.

The input unit 430 may provide a user interface to select two or more images among a plurality of images including the first image, the second image, and the acquired at least one image. A user may select an image displayed on the user interface by using an input device. This is described below in detail with reference to FIG. 11.

The image reconstruction unit 420 may reconstruct an image of the object based on an image selected by a user. The image reconstruction unit 420 may change a position of at least one image among a plurality of images, which is selected by the user. The image reconstruction unit 420 may employ the above-described method of adjusting a difference between the first image and the second image as a method of adjusting a difference among a plurality of images.

The display unit 440 may display an image of the object that is reconstructed by the image reconstruction unit 420. The user may diagnose the object based on the reconstructed object image displayed by the display unit 440.

Figure 6A:
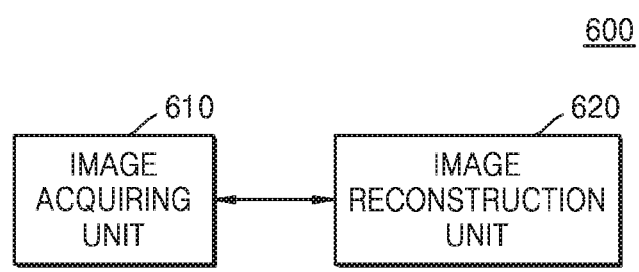
FIGS. 6A and 6B are block diagrams of a diagnostic imaging apparatus according to an embodiment.
Figure 6B:
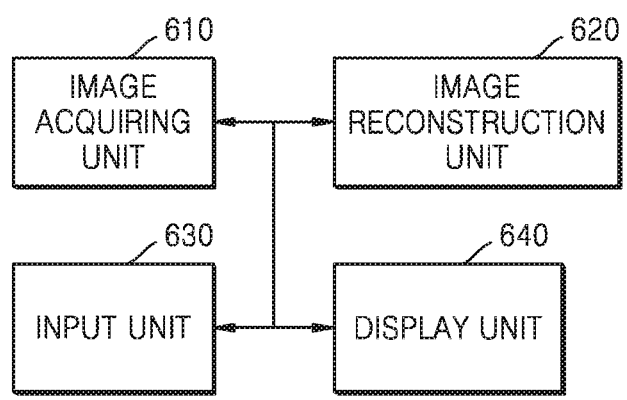

FIGS. 6A and 6B are block diagrams of a diagnostic imaging apparatus 600 according to an embodiment.

Referring to FIG. 6A, the diagnostic imaging apparatus 600 according to the present embodiment may include a data acquiring unit 610 and an image reconstruction unit 620. Also, referring to FIG. 6B, the diagnostic imaging apparatus 600 according to an embodiment may further include an input unit 630 and a display unit 640, in addition to the data acquiring unit 610 and the image reconstruction unit 620. However, all the illustrated elements are not essential elements. The diagnostic imaging apparatus 600 may be embodied with more or less elements than the ones shown.

The above-described elements are described below in sequence.

The data acquiring unit 610 may acquire first projection data obtained by imaging the object in a first section of a first cycle. The projection data may be a data value corresponding to the intensity of an X-ray that has passed through the object. In order to reconstruct an image of the object, in general, projection data obtained by imaging the object in an angular section exceeding a sum of 180° and the fan angle may be necessary. For example, when the fan angle is 60°, the data acquiring unit 610 may acquire a plurality of pieces of projection data imaged in an angular section of a total of 240°. In doing so, the data acquiring unit 610 may acquire the first projection data by driving the CT system 100. Alternatively, the data acquiring unit 610 may receive the first projection data from an external device storing the first projection data.

The data acquiring unit 610 may acquire a second projection data obtained by imaging the object in a second section, which corresponds to the first section, of the second cycle. The second section corresponding to the first section may be a section having the same position in the second cycle as the position of the first section of the first cycle. For example, when the first section starts 0.1 seconds after the pressure in the heart becomes the highest in the first cycle, the second section may be a section that starts 0.1 seconds after the pressure in the heart becomes the highest in the second cycle.

The image reconstruction unit 620 may reconstruct an image of the object based on a difference between the first projection data and the second projection data. In this state, the size of each of the angular sections where the first projection data and the second projection data are imaged may be equal to or less than 180°. The image reconstruction unit 620 according to the present embodiment may reconstruct an image of the object based on the projection data of the sections that are symmetrical or identical to each other and where the first projection data and the second projection data are imaged. Because the projection data is acquired by projecting an X-ray toward the object, similarity between the projection data may exist not only in the sections for imaging the object at an identical angle, but also in the sections for imaging the object at a symmetrical angle. An angular section 1418 of FIG. 14A, where the object is imaged, and an angular section 1428 of FIG. 14B, where the object is imaged, are symmetrical to each other. Also, an angular section 1618 of FIG. 16A, where the object is imaged, and an angular section 1628 of FIG. 16B, where the object is imaged, are identical to each other.

The image reconstruction unit 620 may more accurately reconstruct an image of the object by selecting projection data that is determined to have high accuracy, among the projection data of the angular sections for imaging the object that are symmetrical to each other (or the projection data of the sections where the angular sections for imaging the object are identical to each other. A method of reconstructing an image, which is performed by the image reconstruction unit 620, based on the projection data of the sections where the angular sections for imaging the object are symmetrical to each other (or the projection data of the sections where the angular sections for imaging the object are identical to each other is described below in detail.

The image reconstruction unit 620 may extract the projection data of the sections where the angular sections for imaging the object are symmetrical to each other, or the projection data of the sections where the angular sections for imaging the object are identical to each other. The image reconstruction unit 620 may compare accuracies of the extracted projection data. The accuracy may be determined based on a scope of the angular section for imaging or similarity with an existing material stored in the database. The database may include at least one piece of the projection data acquired as a result of the repeated imaging of the same object in advance. However, this is a mere embodiment and a determination standard of the accuracy may be variously determined according to user's settings.

The diagnostic imaging apparatus 600 according to the present embodiment may select more accurate projection data among the projection data of the angular sections for imaging the object are symmetrical to each other, by selecting the projection data that is determined to be more accurate among the extracted projection data. For example, when the first section is a more accurate symmetrical section in the first projection data and the second section is a less accurate symmetrical section in the second projection data, the projection data of the second section of the second projection data may be replaced with the projection data of the first section of the first projection data.

The diagnostic imaging apparatus 600 according to an embodiment may select more accurate projection data among the projection data of the sections where the angular sections for imaging the object are identical to each other, by selecting projection data that is determined to be more accurate among the extracted projection data.

For example, when the first section is an identical section having a relatively high accuracy in the first projection data and the second section is an identical section having a relatively low accuracy in the second projection data, the projection data of the second section of the second projection data may be replaced with the projection data of the first section of the first projection data.

Alternatively, the diagnostic imaging apparatus 100 may replace the projection data of the identical sections or the symmetrical sections with an average of the respective projection data extracted from the identical sections or the symmetrical sections.

Although the first projection data and the second projection data are obtained by imaging the heart that regularly moves, there may be a difference in the movement of the heart for each cycle and thus the images of the heart may not match each other. The diagnostic imaging apparatus 600 according to the present embodiment may acquire a more accurate reconstructed image of the object by combining the first projection data and the second projection data after adjusting the difference therebetween.

The diagnostic imaging apparatus 600 may acquire a more accurate reconstructed image of the object by adjusting a difference between pieces of the projection data acquired before the image of the object is reconstructed. The method of adjusting the difference between pieces of the projection data acquired by the diagnostic imaging apparatus 600 according to the present embodiment is not limited to the above-described method. The user may variously set the method of adjusting a difference between projection data based on the characteristics of the acquired projection data, the state of the object, previously stored image materials of the object, etc.

The input unit 630 may provide a user interface for selecting two or more pieces of projection data among a plurality of pieces of projection data including the first projection data, the second projection data, and the acquired at least one piece of the projection data. The user may select an image displayed on the user interface by using an input device.

The image reconstruction unit 620 may reconstruct an image of the object based on the projection data selected by the user. The image reconstruction unit 620 may change at least one piece of the projection data among the plurality of pieces of projection data selected by the user.

A image reconstruction unit 620 according to an embodiment may generate a first image and a second image that are respectively reconstructed from the first projection data and the second projection data based on projection data changed based on the difference between the first projection data and the second projection data. The image reconstruction unit 620 may reconstruct an image of the object based on the first image and the second image. The first image may be an image reconstructed from the changed first projection data and the second image may be an image reconstructed from the changed second projection data.

The image reconstruction unit 620 according to the present embodiment may change at least one piece of the projection data among the first projection data and the second projection data based on the difference between the first projection data and the second projection data. The image reconstruction unit 620 may reconstruct an image of the object based on the changed at least one piece of the projection data.

For example, the projection data in an angular section that is common to both the first projection data and the second projection data may be replaced with any one piece of the projection data having a relatively high accuracy. The image reconstruction unit 620 may reconstruct an image of the object based on the replacement piece of the projection data.

Alternatively, the image reconstruction unit 620 may change the projection data of the common angular section to an average of the projection data of the respective common angular sections. After changing the projection data of the common angular section to an average of the projection data of the respective common angular sections, the image reconstruction unit 620 may reconstruct an image of the object based on the above change.

The image reconstruction unit 620 according to an embodiment may replace the projection data of an angular section that is symmetrical to the first projection data and the second projection data with any one piece of projection data having a relatively high accuracy. The image reconstruction unit 620 may reconstruct an image of the object based on the replacement piece of the projection data.

Alternatively, the image reconstruction unit 620 may change the projection data of the symmetrical angular section to an average of the projection data of the respective symmetrical angular sections. After changing the projection data of the symmetrical angular section to an average of the projection data of the respective symmetrical angular sections, the image reconstruction unit 620 may reconstruct an image of the object based on the above change.

The display unit 640 may display the image of the object reconstructed by the image reconstruction unit 620. The user may diagnose the object based on the reconstructed image of the object output to the display unit 640.

Figure 7:
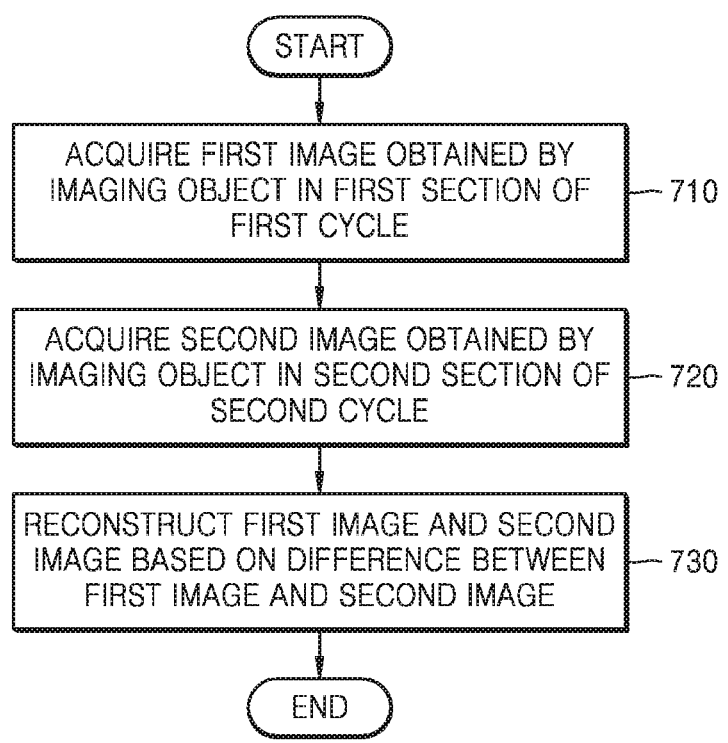
FIG. 7 is a flowchart illustrating a diagnostic imaging method according to an embodiment.

FIG. 7 is a flowchart illustrating a diagnostic imaging method according to an embodiment.

In Operation 710, the diagnostic imaging apparatus 400 of FIG. 4 acquires the first image obtained by imaging the object in the first section of the first cycle. The first image may be a CT image. Also, the first image may be an image reconstructed from the projection data of the object. Alternatively, in the following description, the heart may be described as the object, for convenience of explanation.

In order to reconstruct an image of the object, in general, projection data obtained acquired as a result of the imaging of the object by the rotating frame 104 of the CT system 100 in an angular section exceeding 180° may be necessary. As described above, the projection data of the object may be data acquired as a result of the imaging of the object as the rotating frame 104 rotates around a predetermined rotation axis. An angle with the predetermined rotation axis, which is made as the rotating frame 104 rotates to image the object, may be referred to as the "imaging angle".

The diagnostic imaging apparatus 400 may acquire the first image reconstructed from the first projection data of the projection data set from the CT image processing unit 126 of the CT system 100 of FIG. 2. The diagnostic imaging apparatus 400 according to the present embodiment may be included in the CT system 100 or may be outside the CT system 100.

In Operation 720, the diagnostic imaging apparatus 400 acquires the second image by imaging the object in the second section, which corresponds to the first section, of the second cycle. The second section corresponding to the first section may be a section of the second cycle which has the same position as that of the first section of the first cycle. For example, when the first section starts 0.1 seconds after the pressure in the heart becomes the highest in the first cycle, the second section may be a section that starts 0.1 seconds after the pressure in the heart becomes the highest in the second cycle.

The diagnostic imaging apparatus 400 may acquire the second image reconstructed from the second projection data from the CT image processing unit 126 of the CT system 100. The size of the angular section where the first projection data and the second projection data are imaged may be less than 180°. Alternatively, when the sum of the sizes of the angular sections where the first projection data and the second projection data are imaged does not exceed 180°, the diagnostic imaging apparatus 400 may additionally acquire an image reconstructed from at least one piece of the projection data. In the following description, for convenience of explanation, it is assumed that the sum of the sizes of the angular sections where the first projection data and the second projection data are imaged exceeds 180°. Alternatively, this is a mere embodiment and the disclosure is not limited thereto.

In Operation 730, the diagnostic imaging apparatus 400 reconstructs the first image and the second image based on the difference between the first image and the second image.

The diagnostic imaging apparatus 400 according to the present embodiment may change the position of the at least one of the first image and the second image. Although the first image and the second image are images of the heart that regularly moves, the images may not match each other because there may be a difference in the movement of the heart in each cycle. For example, positions of the coronary arteries of the heart may be different in each of the first image and the second image.

In order to acquire a more accurate reconstructed image of the object, the diagnostic imaging apparatus 400 may adjust the difference between the first image and the second image and then combine the first image and the second image. As the method of adjusting the difference between the first image and the second image, the diagnostic imaging apparatus 400 may change the position of at least one of the first image and the second image based on the object that is commonly included in the first image and the second image.

For example, when the object that is commonly included in the first image and the second image is the coronary arteries, the diagnostic imaging apparatus 400 may change the position of at least one of the first image and the second image based on the coronary arteries. The method of adjusting the difference between the first image and the second image by the diagnostic imaging apparatus 400 is described below in detail with reference to FIG. 8.

Alternatively, the diagnostic imaging apparatus 400 may adjust the difference between the first image and the second image based on the movement information of any one of the first image and the second image which is extracted based on the other one of the first image and the second image. The movement information may be, for example, a motion vector of any one image with respect to the other image. The motion vector may include information about the direction and value in which any one image of the first image and the second image moves with respect to the other one of the first image and the second image in order to increase similarity between the first image and the second image.

The diagnostic imaging apparatus 400 may move any one image based on the motion vector such that the similarity between the first image and the second image may be over a reference value. The similarity may be determined based on a result of the comparing of the shading information between the first image and the second image. The shading information may be an image signal value at a pixel, in detail, a brightness value of a predetermined pixel forming an image.

The diagnostic imaging apparatus 400 may compare a brightness value of each pixel of the first image with a brightness value of each pixel of the second image and change the position of the second image based on the first image such that a rate of pixels having the same brightness values may be over 90%.

Alternatively, the comparing of the shading information, for example, the brightness value, between images in units of pixels by the diagnostic imaging apparatus 400 is a mere embodiment of the disclosure and the shading information may be compared between images in units of blocks that are sets of pixels.

The diagnostic imaging apparatus 400 may reconstruct an image of the object by summing the pixel values of the first image and the second image with the difference therebetween having been adjusted. The pixel value may include the shading information that is generated as a result of the imaging of the object. The diagnostic imaging apparatus 400 may sum the pixel values) by applying a weight to each of the shading information of the pixels forming the first image and the shading information of the pixels forming the second image. For example, when the accuracy of the second image is determined to be higher than that of the first image, the pixel values may be summed by increasing a weight of the shading information of the pixels of the second image. In the above-described example, the diagnostic imaging apparatus 400 may sum a value obtained by applying a weight of 0.3 to the pixel value of the first image and a value obtained by applying a weight of 0.3 to the pixel value of the second image.

Also, the diagnostic imaging apparatus 400 may sum the pixel values of the first image and the second image by dividing pixels of each image into parts according to accuracy and applying different weights to the parts. For example, while the pixel value of one half of an image may be obtained by summing a value obtained by multiplying a weight of 0.7 to the pixel value of the first image and a value obtained by multiplying a weight of 0.3 to the pixel value of the second image, the pixel value of the other half of the image may be obtained by summing a value obtained by multiplying a weight of 0.4 to the pixel value of the first image and a value obtained by multiplying a weight of 0.6 to the pixel value of the second image.

However, this is a mere embodiment and all existing methods used to match a plurality of images may be employed therefore.

The diagnostic imaging apparatus 400 according to the present embodiment may output an image reconstructed from the first image and the second image. The user may diagnose the object based on the output reconstructed image.

Figure 8:
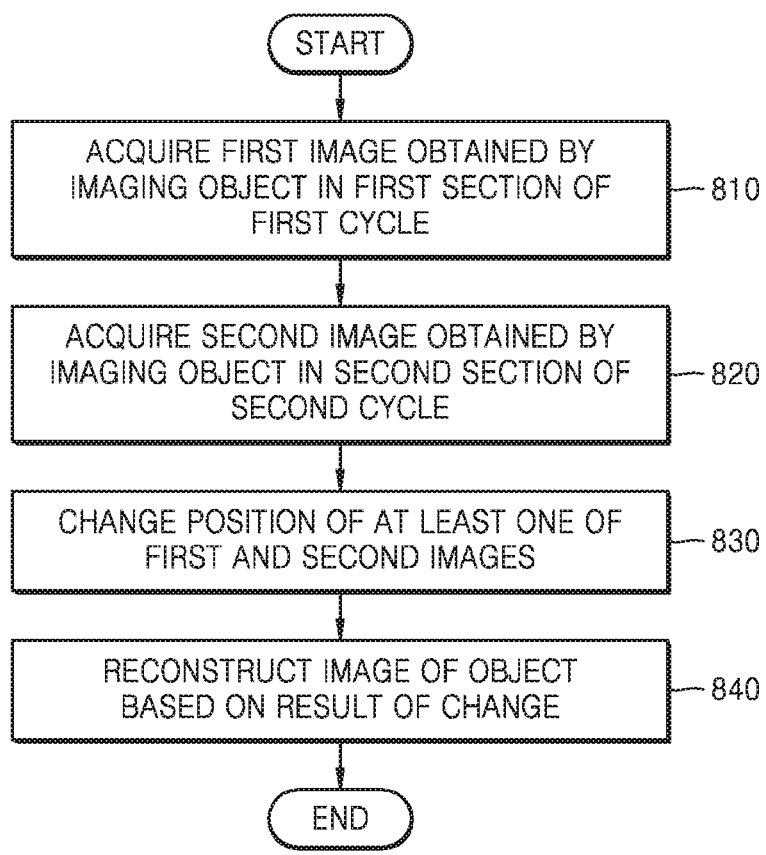
FIG. 8 is a flowchart illustrating a detailed method of adjusting a difference between images of an object imaged by a diagnostic imaging apparatus, according to an embodiment.

FIG. 8 is a flowchart illustrating a detailed method of adjusting a difference between images of an object imaged by the diagnostic imaging apparatus 400, according to an embodiment.

In Operation 810, the diagnostic imaging apparatus 400 of FIG. 4 may acquire the first image obtained by imaging the object in the first section of the first cycle. The first image may be a CT image. Also, the first image may be an image reconstructed from the projection data of the object.

Alternatively, Operation 810 may correspond to Operation 710 of FIG. 7.

In Operation 820, the diagnostic imaging apparatus 400 may acquire the second image by imaging the object in the second section of the second cycle, the second section corresponding to the first section. The second section corresponding to the first section may be a section of the second cycle which has the same position as that of the first section of the first cycle.

Alternatively, Operation 820 may correspond to Operation 720 of FIG. 7.

In Operation 830, the diagnostic imaging apparatus 400 may change the position of at least one of the first image and the second image. Although the first image 910 and the second image 920 acquired by the diagnostic imaging apparatus 400 are images of the same heart, it may be checked that the positions of the coronary arteries located in each image are different. This discrepancy may be generated due to a change in the imaging environment and a minute change in the movement of the heart.

In the diagnostic imaging apparatus 400 according to the present embodiment, the position of the at least one image may be changed to adjust the difference between the first image and the second image. For example, the diagnostic imaging apparatus 400 may change the position of the at least one image based on the common object that is included in the first image and the second image.

For example, the diagnostic imaging apparatus 400 may select an object having a clear edge among the images of the object and determine the selected object as the object that is commonly included in the images. For an image of the heart, the edges of the coronary arteries may be clearly displayed. In this case, the diagnostic imaging apparatus 400 may determine the coronary arteries as the object that is commonly included in the first image and the second image. The diagnostic imaging apparatus 400 may change the position of the second image such that the positions of the coronary arteries of the first image may match the positions of the coronary arteries of the second image.

Also, the diagnostic imaging apparatus 400 may change the positions of all images without changing the position of any one image only. For example, the diagnostic imaging apparatus 400 may change the positions of both of the first image and the second image.

When three or more images of the object exist, the diagnostic imaging apparatus 400 may determine the object that is commonly included in each of a plurality of images in the same method as that applied to the first image and the second image, and may adjust the difference between the images.

In Operation 840, the diagnostic imaging apparatus 400 may reconstruct an image of the object based on a result of the change of the position of the at least one of the first image and the second image.

The diagnostic imaging apparatus 400 according to the present embodiment may reconstruct an image of the object by summing the pixel values of the first image and the second image with the difference therebetween having been adjusted. The pixel value may include the shading information generated as a result of imaging the object.

Alternatively, Operation 840 may correspond to Operation 730 of FIG. 7.

Figure 10:
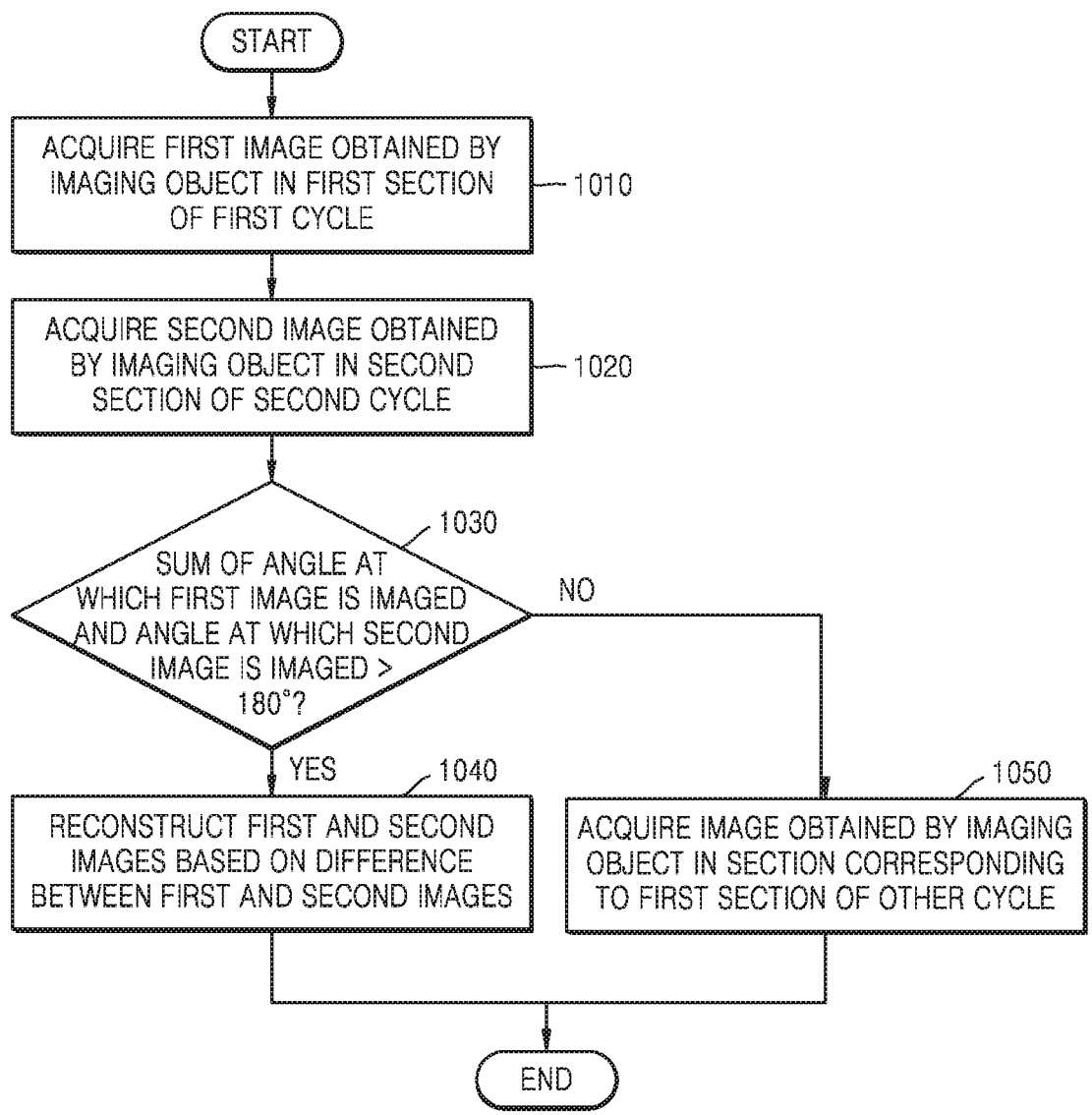
FIG. 10 is a flowchart illustrating a method of acquiring an image of an object imaged by a diagnostic imaging apparatus, according to an embodiment.

FIG. 10 is a flowchart illustrating a method of acquiring an image of an object imaged by the diagnostic imaging apparatus 400, according to an embodiment.

In Operation 1010, the diagnostic imaging apparatus 400 of FIG. 4 may acquire information about beats per minute (BPM) of the object. For example, the diagnostic imaging apparatus 400 of FIG. 4 may acquire information that the BPM of the object is 90 to acquire an image of the heart. Also, the diagnostic imaging apparatus 400 of FIG. 4 may acquire information about the age of the object, a disease of the object, etc., in addition to the information of the BPM of the object.

In Operation 1020, the diagnostic imaging apparatus 400 of FIG. 4 may determine the number of projection data need to reconstruct a heart image of the object based on the acquired information of the BPM of the object. In order to reconstruct the heart image, at least one piece of the projection data imaged in the angular section of the value obtained by adding the fan angle to 180°. Accordingly, by taking into account the acquired information of the BPM of the object, the diagnostic imaging apparatus 400 of FIG. 4 may determine how much projection data is necessary to acquire at least one piece of the projection data imaged in the angular section of the value obtained by adding the fan angle to 180°.

The diagnostic imaging apparatus 400 of FIG. 4 may acquire projection data whose number is determined by imaging the heart of the object. In the following description, it is assumed that the number of pieces of projection data needed to reconstruct the heart image is 2.

In Operation 1030, the diagnostic imaging apparatus 400 of FIG. 4 may acquire the first image by imaging the object in the first section of the first cycle. The first image may be a CT image that is reconstructed based on the acquired first projection data.

Alternatively, Operation 1030 may correspond to Operation 710 of FIG. 7.

In Operation 1040, the diagnostic imaging apparatus 400 may acquire the second image obtained by imaging the object in the second section of the second cycle, the second section corresponding to the first section. The second image corresponding to the first section may be a section of the second cycle which has the same position as that of the first section of the first cycle. Also, the second image may be a CT image reconstructed based on the acquired second projection data.

Alternatively, Operation 1040 may correspond to Operation 720 of FIG. 7.

In Operation 1050, the diagnostic imaging apparatus 400 may reconstruct a plurality of images based on the differences between the images.

The diagnostic imaging apparatus 400 according to the present embodiment may change the position, shape, and size of at least one of the images. The diagnostic imaging apparatus 400 may reconstruct an image of the object the changed at least one image.

Figure 11:
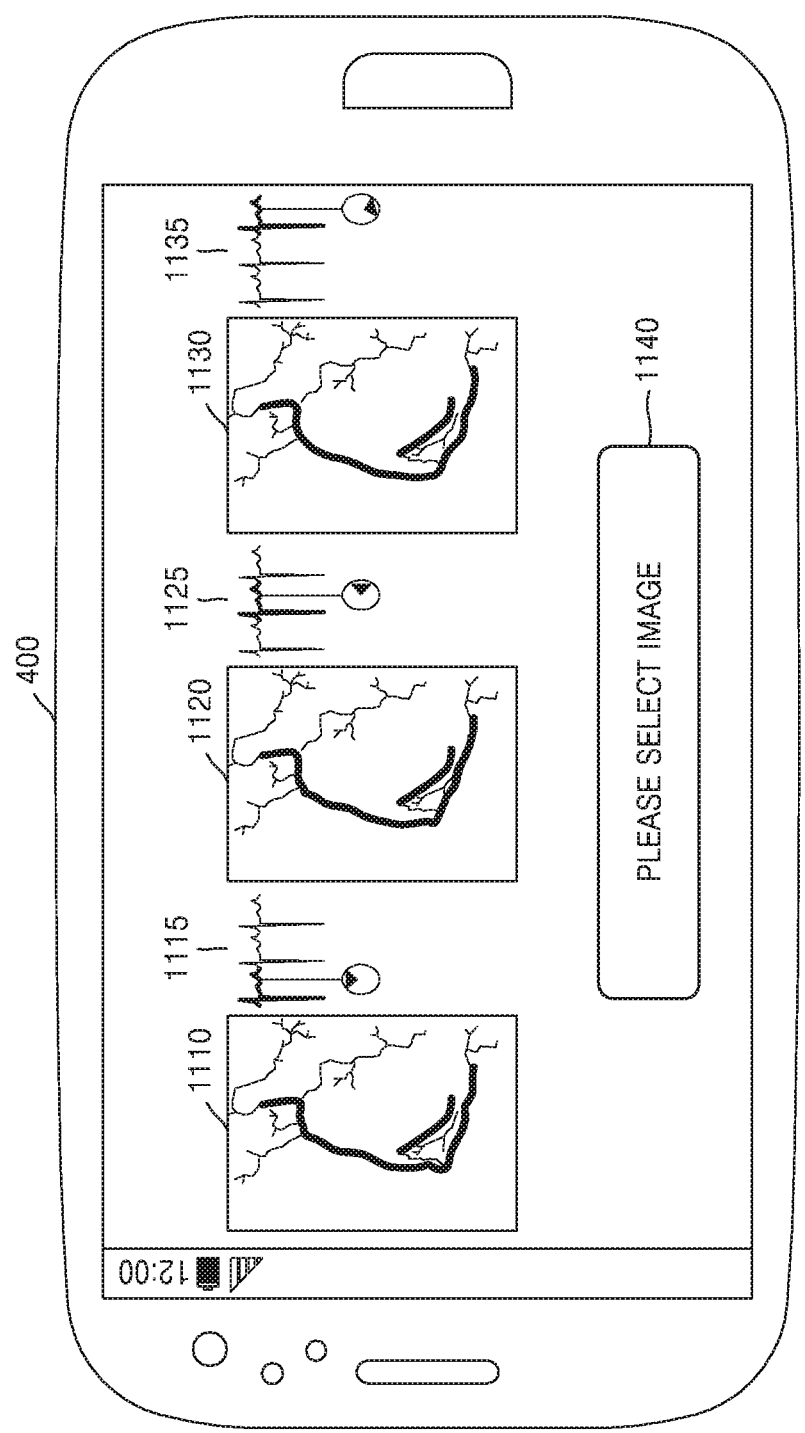
FIG. 11 illustrates a user interface provided to select an image so that a diagnostic imaging apparatus according to an embodiment may acquire a reconstructed image of an object.

FIG. 11 illustrates a user interface provided to select an image so that a diagnostic imaging apparatus 400 according to an embodiment may acquire a reconstructed image of an object.

Referring to FIG. 11, a user interface may display a first image 1110 of the object imaged in the first section of the first cycle, a second image 1120 of the object imaged in the second section of the second cycle, and a third image 1130 of the object imaged in a third section of the third cycle. Also, the user interface may display information 1115, 1125, and 1135 about a time section where each image is formed, together with the first, second, and third images 1110, 1120, and 1130. Alternatively, the information 1115, 1125, and 1135 about the respective imaging time sections may be displayed with information about the angular sections where the images are formed. The user may determine whether the sum of the sizes of the angular sections where the acquired at least one image is formed exceeds 180° based on the displayed angular section information.

Alternatively, the user interface may display a request window 1140 that requests the user to select an image to be used as a base for reconstructing an image of the object among the acquired images. The user may select at least one image that is determined to be suitable for reconstructing an image of the object by referring to the angular section where each image is formed.

For example, when the angular section where the first image 1110 is imaged is from 330° to 45°, the angular section where the second image 1120 is imaged is from 40° to 135°, and the angular section where the third image 1130 is imaged is from 120° to 200°, the user may select the first image 1110, the second image 1120, and the third image 1130 through the user interface and acquire a plurality of images in which the sum of the imaging angular sections exceeds 180°.

According to the present embodiment, the user may select at least one image of the images displayed on the user interface by using an input device such as a mouse, a keyboard, etc. Alternatively, when the diagnostic imaging apparatus 400 includes a touch screen, the user may select at least one of the images displayed on the user interface by using a finger or a touch pen.

Figure 12:
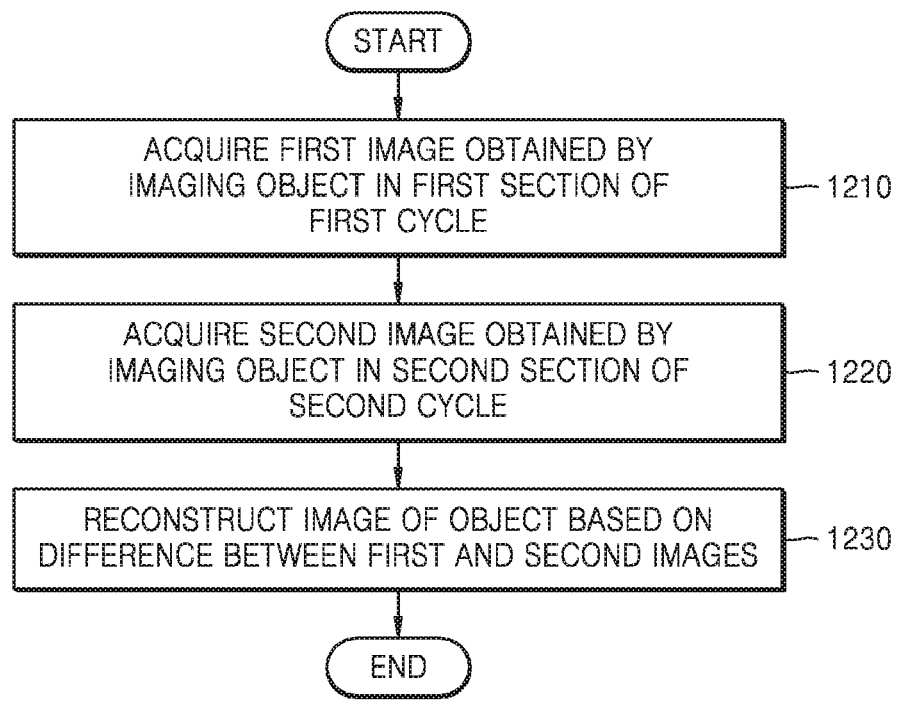
FIG. 12 is a flowchart illustrating a method of reconstructing an image of the object based on projection data of the object, which is performed by a diagnostic imaging apparatus, according to an embodiment.

FIG. 12 is a flowchart illustrating a method of reconstructing an image of the object based on projection data of the object, which is performed by the diagnostic imaging apparatus 600 according to an embodiment.

In Operation 1210, the diagnostic imaging apparatus 600 acquires the first projection data obtained by imaging the object in the first section of the first cycle. The projection data may be a data value corresponding to the intensity of an X-ray that has passed through the object.

In order to reconstruct an image of the object, in general, projection data having a sum of the sizes of the angular sections where the object is imaged is necessary. The diagnostic imaging apparatus 600 may acquire the first projection data by driving the CT system 100. Alternatively, the data acquiring unit 610 may receive the first projection data from an external device storing the first projection data.

In Operation 1220, the diagnostic imaging apparatus 600 acquires the second projection data obtained by imaging the object in the second section, which corresponds to the first section, of the second cycle. The second section corresponding to the first section may be a section that has the same position in the second cycle as that of the first section of the first cycle. For example, when the first section starts 0.1 seconds after the pressure in the heart becomes the highest in the first cycle, the second section may be a section that starts 0.1 seconds after the pressure in the heart becomes the highest in the second cycle.

The image reconstruction unit 620 according to an embodiment may generate the first image and the second image respectively reconstructed from the first projection data and the second projection data based on the difference between the first projection data and the second projection data. The image reconstruction unit 620 may reconstruct an image of the object based on the first image and the second image.

For example, the projection data of the angular section that is common to the first projection data and the second projection data may be changed to an average of each projection data. The image reconstruction unit 620 may generate the first image and the second image based on the changed first projection data and the changed second projection data. The first image may be an image reconstructed from the changed first projection data and the second image may be an image reconstructed from the changed second projection data.

In Operation 1230, the diagnostic imaging apparatus 600 reconstructs an image of the object based on the difference between the first projection data and the second projection data. It is assumed that a sum of the sizes of the angular sections where the first projection data and the second projection data are images exceeds 180°.

The diagnostic imaging apparatus 600 according to the present embodiment may reconstruct an image of the object based on the difference in the projection data between the imaging angular sections that are symmetrical or identical to each other in the first projection data and the second projection data. Because the projection data is acquired by projecting an X-ray toward the object, similarity between the projection data may exist not only in the sections for imaging the object at an identical angle, but also in the sections for imaging the object at a symmetrical angle.

The diagnostic imaging apparatus 600 may select projection data that is determined to have a relatively high accuracy among the projection data of the sections where the image angles are symmetrical or identical to each other. The diagnostic imaging apparatus 600 may select, as the projection data having a relatively high accuracy, projection data having a relatively high similarity with a previous projection data among the first projection data and the second projection data, based on the database previously stored based on previous imaging records of the object.

For example, when the accuracy of the first projection data is determined to be higher than the projection data of the sections where the imaging angles are symmetrical or identical to each other, the diagnostic imaging apparatus 600 may determine the projection data of the corresponding section as the first projection data. The diagnostic imaging apparatus 600 may replace the projection data of the sections where the imaging angles are symmetrical or identical to each other with the determined projection data and then reconfigure a heart image of the object based on the projection data between the imaging angles.

The diagnostic imaging apparatus 400 according to an embodiment may output the reconstructed image of the object. The user may diagnose the object based on the output reconstructed image.

Alternatively, when the sum of the angular sections where the object is imaged does not exceed 180° as a result of the determining of the first projection data and the second projection data, the diagnostic imaging apparatus 600 may additionally acquire the projection data obtained by imaging the object in other cycle.

Figure 13A:
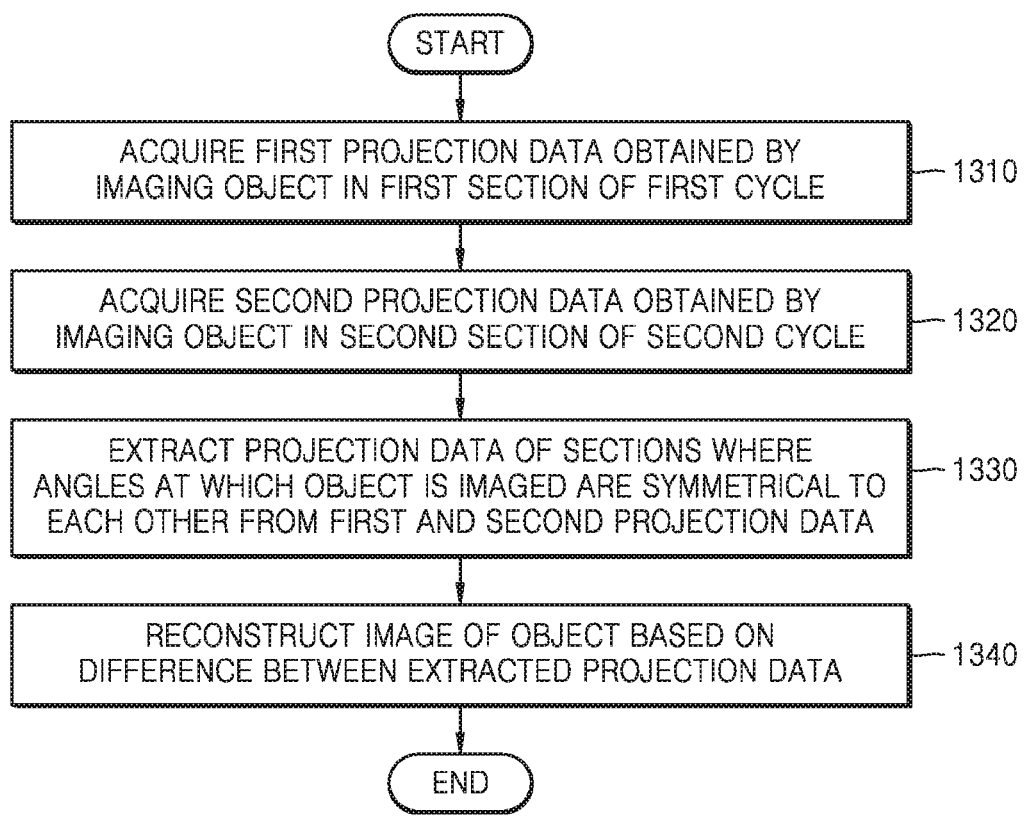
FIG. 13A is a flowchart illustrating a method of reconstructing an image of an object based on projection data of sections where angles at which a diagnostic imaging apparatus according to an embodiment images the object are symmetrical to each other.

FIG. 13A is a flowchart illustrating a method of reconstructing an image of an object based on projection data of sections where angles at which the diagnostic imaging apparatus 600 according to an embodiment images the object are symmetrical to each other.

In Operation 1310, the diagnostic imaging apparatus 600 may acquire the first projection data obtained by imaging the object in the first section of the first cycle. The projection data may be a set of data values corresponding to the intensity of an X-ray that has passed through the object.

Alternatively, Operation 1310 may correspond to Operation 1210 of FIG. 12.

In Operation 1320, the diagnostic imaging apparatus 600 may acquire the second projection data obtained by imaging the object in the second section, which corresponds to the first section, of the second cycle. The second section corresponding to the first section may be a section that has the same position in the second cycle as that of the first section of the first cycle.

Alternatively, Operation 1320 may correspond to Operation 1220 of FIG. 12.

In Operation 1330, the diagnostic imaging apparatus 600 may extract the projection data of the angular sections for imaging the object that are symmetrical to each other in the first projection data and the second projection data. The angular sections for imaging the object that are symmetrical to each other section are described in detail with reference to FIG. 14.

Figure 14A:
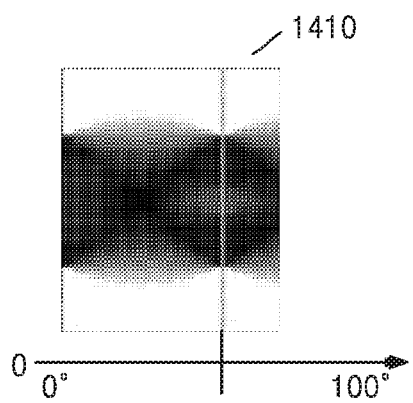
FIGS. 14A and 14B illustrate the projection data of sections where angles at which the object is imaged are symmetrical, according to an embodiment.
Figure 14B:
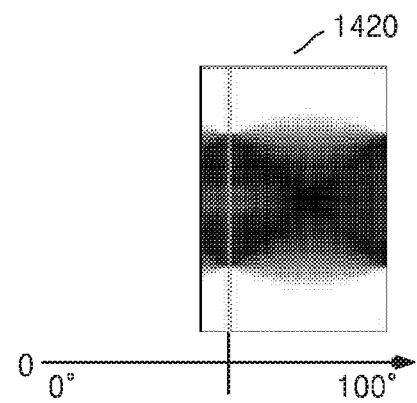
Figure 14B:
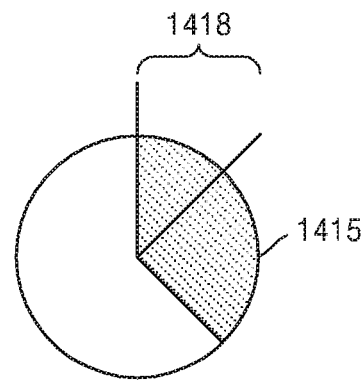
Figure 14B:
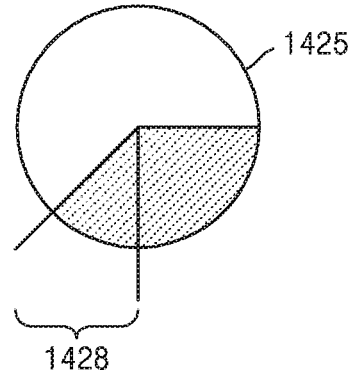

FIGS. 14A and 14B illustrate the projection data of sections where angles at which the object is imaged are symmetrical to each other, according to an embodiment.

Referring to FIG. 14A, a first projection data 1410 acquired in the first section of the first cycle and an angular section 1415 where the first projection data 1410 is imaged are illustrated.

The diagnostic imaging apparatus 600 may acquire the first projection data 1410 that is imaged in the angular section between 0° and 120°.

Referring to FIG. 14B, a second projection data 1420 acquired in the second section of the second cycle and an angular section 1425 where the second projection data 1420 is imaged are illustrated.

The diagnostic imaging apparatus 600 may acquire the second projection data 1420 that is imaged in the angular section between 90° and 225°.

In FIGS. 14A and 14B, the projection data of the sections where the imaging angles are symmetrical to each other may be the first projection data acquired in the angular section 1418 between 0° and 45° and the second projection data acquired in the angular section 1428 between 180° and 225°. Because the projection data is acquired by projecting an X-ray toward the object, the projection data of sections where the angular sections that are symmetrical to each other may have similarity to each other.

Referring back to FIG. 13A, the diagnostic imaging apparatus 600 may determine sections where the imaging angular sections are symmetrical to each other and then may extract the projection data from each of the determined imaging angular sections.

In Operation 1340, the diagnostic imaging apparatus 600 may reconstruct an image of the object based on the difference between the extracted projection data. Operation 1340 may correspond to Operation 1230 of FIG. 12 in which the projection data of the sections where the imaging angles are symmetrical to each other is extracted from each projection data. The method of reconstructing an image of the object based on the difference between the projection data extracted by the diagnostic imaging apparatus 600 is described in detail below with reference to FIG. 13B.

Figure 13B:
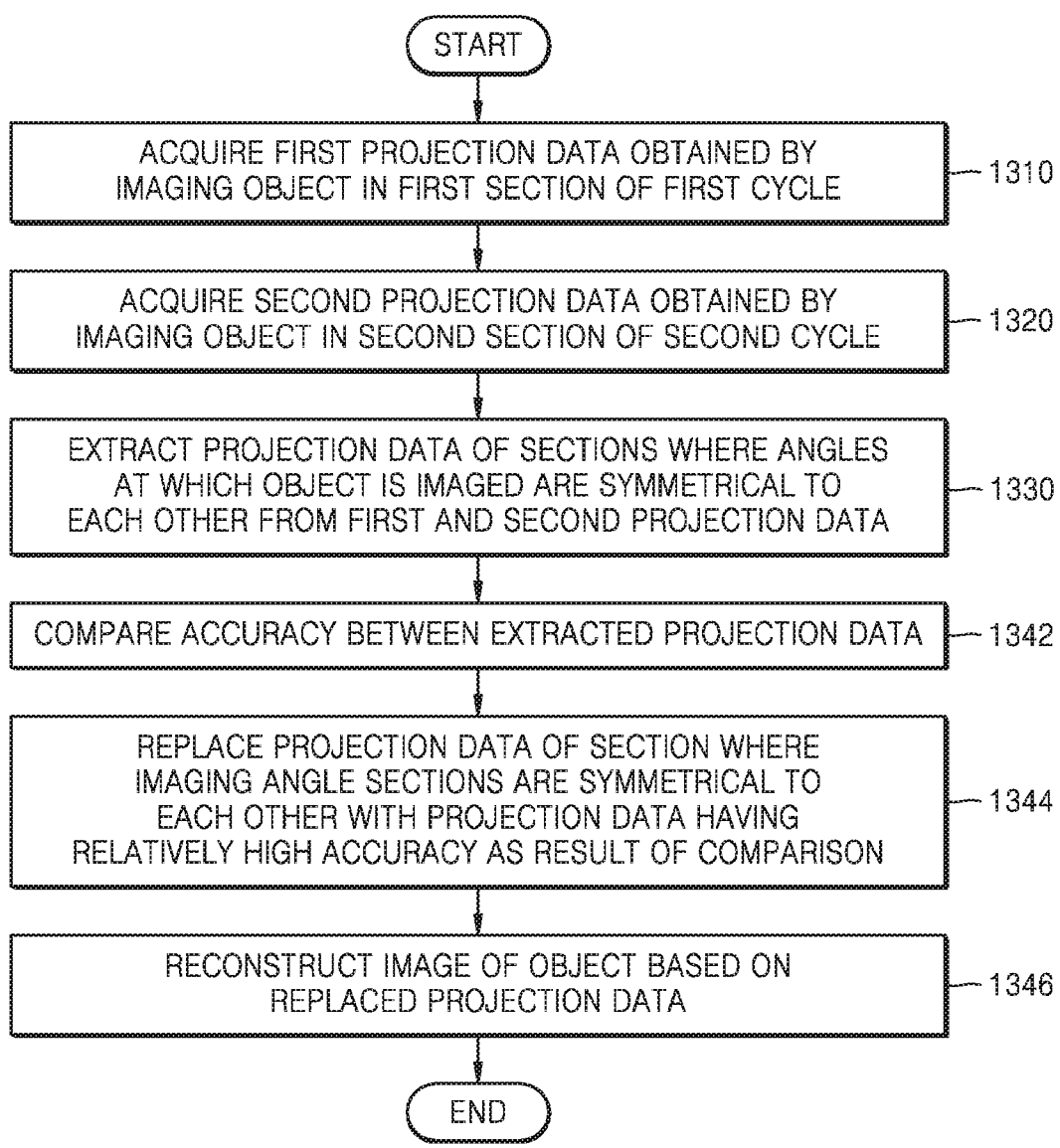
FIG. 13B is a flowchart illustrating a method of reconstructing an image of an object based on projection data of sections where angles at which a diagnostic imaging apparatus according to an embodiment images the object are symmetrical to each other.

FIG. 13B is a flowchart illustrating a method of reconstructing an image of an object based on projection data of sections where angles at which the diagnostic imaging apparatus 600 according to an embodiment images the object are symmetrical to each other.

In Operation 1310, the diagnostic imaging apparatus 600 may acquire the first projection data obtained by imaging the object in the first section of the first cycle. Operation 1310 of FIG. 13B may correspond to Operation 1310 of FIG. 13A.

In Operation 1320, the diagnostic imaging apparatus 600 may acquire the second projection data obtained by imaging the object in the second section, which corresponds to the first section, of the second cycle. Operation 1320 of FIG. 13B may correspond to Operation 1320 of FIG. 13A.

In Operation 1330, the diagnostic imaging apparatus 600 may extract the projection data of the angular sections for imaging the object that are identical to each other in the first projection data and the second projection data. Operation 1330 of FIG. 13B may correspond to Operation 1330 of FIG. 13A.

In Operation 1342, the diagnostic imaging apparatus 600 may compare accuracy between the extracted projection data.

The diagnostic imaging apparatus 600 may compare accuracy between the extracted projection data based on the database for previously storing CT images obtained by imaging the heart of the object in advance. The database may include reconstructed CT images obtained by imaging the heart of the object in advance, the projection data acquired as a result of the imaging of the heart of the object, and information about the time when the CT image and the projection data are acquired.

The diagnostic imaging apparatus 600 may compare the accuracy between the extracted projection data with the database and may determine accuracy of the extracted projection data based on a degree of matching with the extracted projection data.

In Operation 1344, the diagnostic imaging apparatus 600 may determine, as a result of the comparison, the projection data having a relatively high accuracy as the projection data of the sections where the imaging angular sections that are symmetrical to each other.

The diagnostic imaging apparatus 600 may select the projection data that has a relatively high degree of matching with the extracted database, that is, the projection data determined to have a relatively high accuracy, as a result of the comparing in Operation 1342. The diagnostic imaging apparatus 600 may determine the selected projection data as the projection data of the sections where the imaging angular sections are symmetrical to each other.

In Operation 1346, the diagnostic imaging apparatus 600 may reconstruct the heart image of the object based on the determined projection data. The diagnostic imaging apparatus 600 may reconstruct the heart image of the object based on the projection data acquired for each angular section with respect to the imaging angular sections (that are not symmetrical to each other and the projection data that is determined to have a relatively high accuracy with respect to the imaging angular sections that are symmetrical to each other.

Figure 15A:
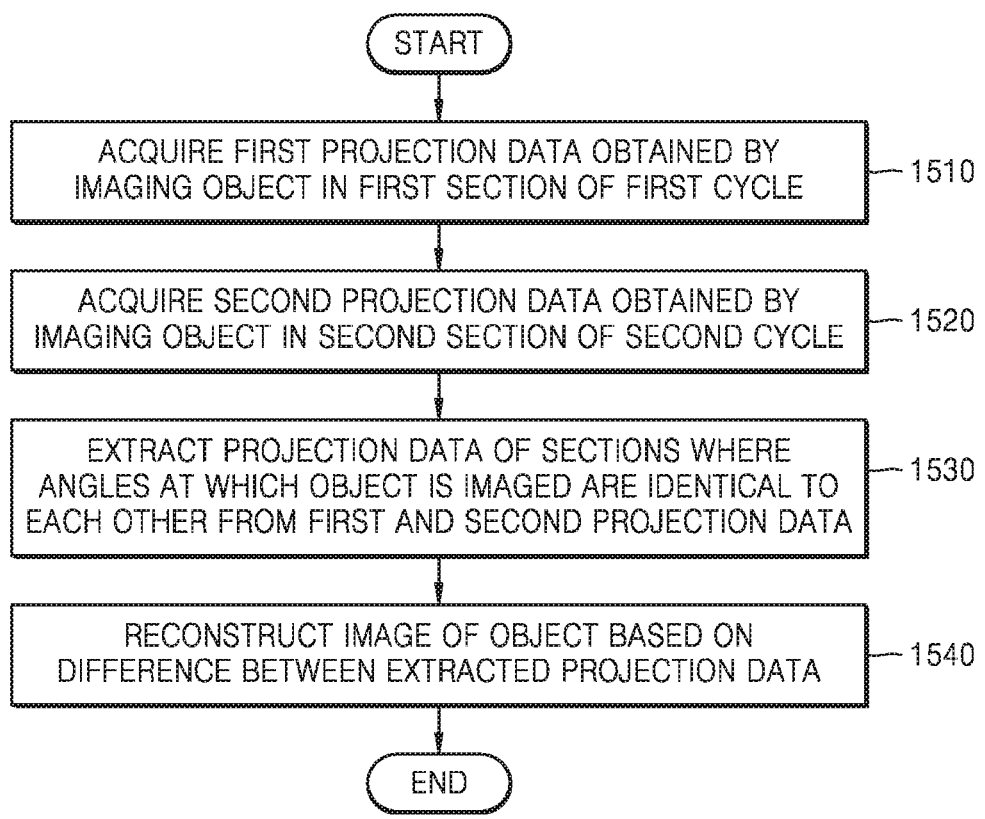
FIG. 15A is a flowchart illustrating a method of reconstructing an image of an object based on projection data of sections where angles at which a diagnostic imaging apparatus according to an embodiment images the object are identical to each other.

FIG. 15A is a flowchart illustrating a method of reconstructing an image of an object based on projection data in a section where an angle at which the diagnostic imaging apparatus 600 according to an embodiment images the object is identical.

In Operation 1510, the diagnostic imaging apparatus 600 may acquire the first projection data obtained by imaging the object in the first section of the first cycle. The projection data may be a set of data values corresponding to the intensity of an X-ray that has passed through the object.

Alternatively, Operation 1510 of FIG. 15A may correspond to Operation 1210 of FIG. 12.

In Operation 1520, the diagnostic imaging apparatus 600 may acquire the second projection data obtained by imaging the object in the second section, which corresponds to the first section, of the second cycle. The second section corresponding to the first section may be a section that has the same position in the second cycle as that of the first section of the first cycle.

Alternatively, Operation 1520 of FIG. 15A may correspond to Operation 1220 of FIG. 12.

In Operation 1530, the diagnostic imaging apparatus 600 may extract the projection data of the angular sections for imaging the object that are identical to each other in the first projection data and the second projection data. The angular sections for imaging the object that are identical to each other section are described in detail with reference to FIGS. 16A and 16B.

FIGS. 16A and 16B illustrate the projection data of sections where angles at which the object is imaged are identical to each other, according to an embodiment.

Referring to FIG. 16A, a first projection data 1610 acquired in the first section of the first cycle and an angular section 1615 where the first projection data 1610 is imaged are illustrated.

The diagnostic imaging apparatus 600 may acquire the first projection data 1610 that is imaged in the angular section between 0° and 135°.

Referring to FIG. 16B, a second projection data 1620 acquired in the second section of the second cycle and an angular section 1625 where the second projection data 1620 is imaged are illustrated.

The diagnostic imaging apparatus 600 may acquire the second projection data 1620 that is imaged in the angular section between 90° and 225°.

In FIGS. 16A and 16B, the projection data of the sections where the imaging angles are identical to each other may be the first projection data acquired in the angular section 1618 between 90° and 135° and the second projection data acquired in the angular section 1628 between 90° and 135°. In general, because the heart regularly moves, even for other cycle, the projection data obtained by imaging the object in the same section of each cycle may have similarity to each other.

Referring to FIG. 15A, the diagnostic imaging apparatus 600 may determine sections where the imaging angular sections are identical to each other and then may extract the projection data from each of the determined imaging angular sections.

Figure 15B:
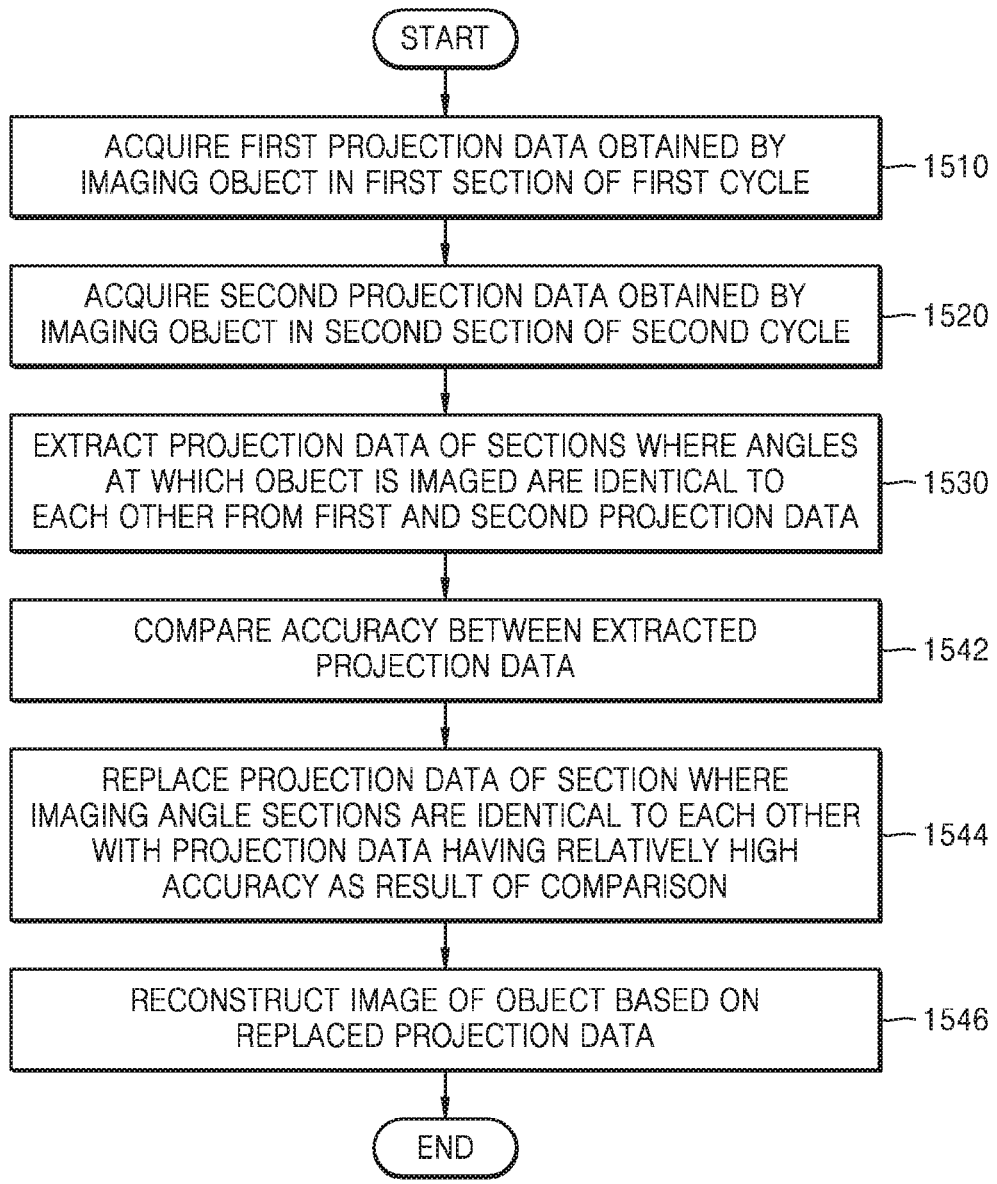
FIG. 15B is a flowchart illustrating a method of reconstructing an image of an object based on projection data of sections where angles at which a diagnostic imaging apparatus according to an embodiment images the object are identical to each other.

In Operation 1540, the diagnostic imaging apparatus 600 may reconstruct an image of the object based on the difference between the extracted projection data. Operation 1540 of FIG. 15A may correspond to Operation 1230 of FIG. 12 in which the projection data of the sections where the imaging angles are identical to each other is extracted from each projection data. The method of reconstructing an image of the object based on the difference between the projection data extracted by the diagnostic imaging apparatus 600 is described in detail below with reference to FIG. 15B. FIG. 15B is a flowchart illustrating a method of recostructing an image of an object based on projection data of sections where angles at which the diagnostic imaging apparatus 600 according to an embodiment images the object are identical to each other.

In Operation 1510, the diagnostic imaging apparatus 600 may acquire the first projection data obtained by imaging the object in the first section of the first cycle. Operation 1510 of FIG. 15B may correspond to Operation 1510 of FIG. 15A.

In Operation 1520, the diagnostic imaging apparatus 600 may acquire the second projection data obtained by imaging the object in the second section, which corresponds to the first section, of the second cycle. Operation 1520 of FIG. 15B may correspond to Operation 1520 of 15A.

In Operation 1530, the diagnostic imaging apparatus 600 may extract the projection data of the angular sections for imaging the object that are identical to each other in the first projection data and the second projection data. Operation 1530 of FIG. 15B may correspond to Operation 1530 of FIG. 15A.

In Operation 1542, the diagnostic imaging apparatus 600 may compare accuracy between the extracted projection data.

The diagnostic imaging apparatus 600 may compare accuracy between the extracted projection data based on the database for previously storing CT images obtained by imaging the heart of the object in advance. The database may include reconstructed CT images obtained by imaging the heart of the object in advance, the projection data acquired as a result of the imaging of the heart of the object, and information about the time when the CT image and the projection data are acquired.

The diagnostic imaging apparatus 600 may compare the accuracy between the extracted projection data with the database and may determine accuracy of the extracted projection data based on a degree of matching with the extracted projection data.

In Operation 1544, the diagnostic imaging apparatus 600 may determine, as a result of the comparison, the projection data having a relatively high accuracy as the projection data of the sections where the imaging angular sections that are symmetrical to each other.

The diagnostic imaging apparatus 600 may select the projection data that has a relatively high degree of matching with the extracted projection data, that is, the projection data determined to have a relatively high accuracy, as a result of the comparing in Operation 1542. The diagnostic imaging apparatus 600 may determine the selected projection data as the projection data of the sections where the imaging angular sections are identical to each other.

In Operation 1546, the diagnostic imaging apparatus 600 may reconstruct the heart image of the object based on the determined projection data. The diagnostic imaging apparatus 600 may reconstruct the heart image of the object based on the projection data acquired for each angular section with respect to the sections where the imaging angular sections are not identical to each other and the projection data that is determined to have a relatively high accuracy with respect to the sections where the imaging angular sections are identical to each other.

Figure 17:
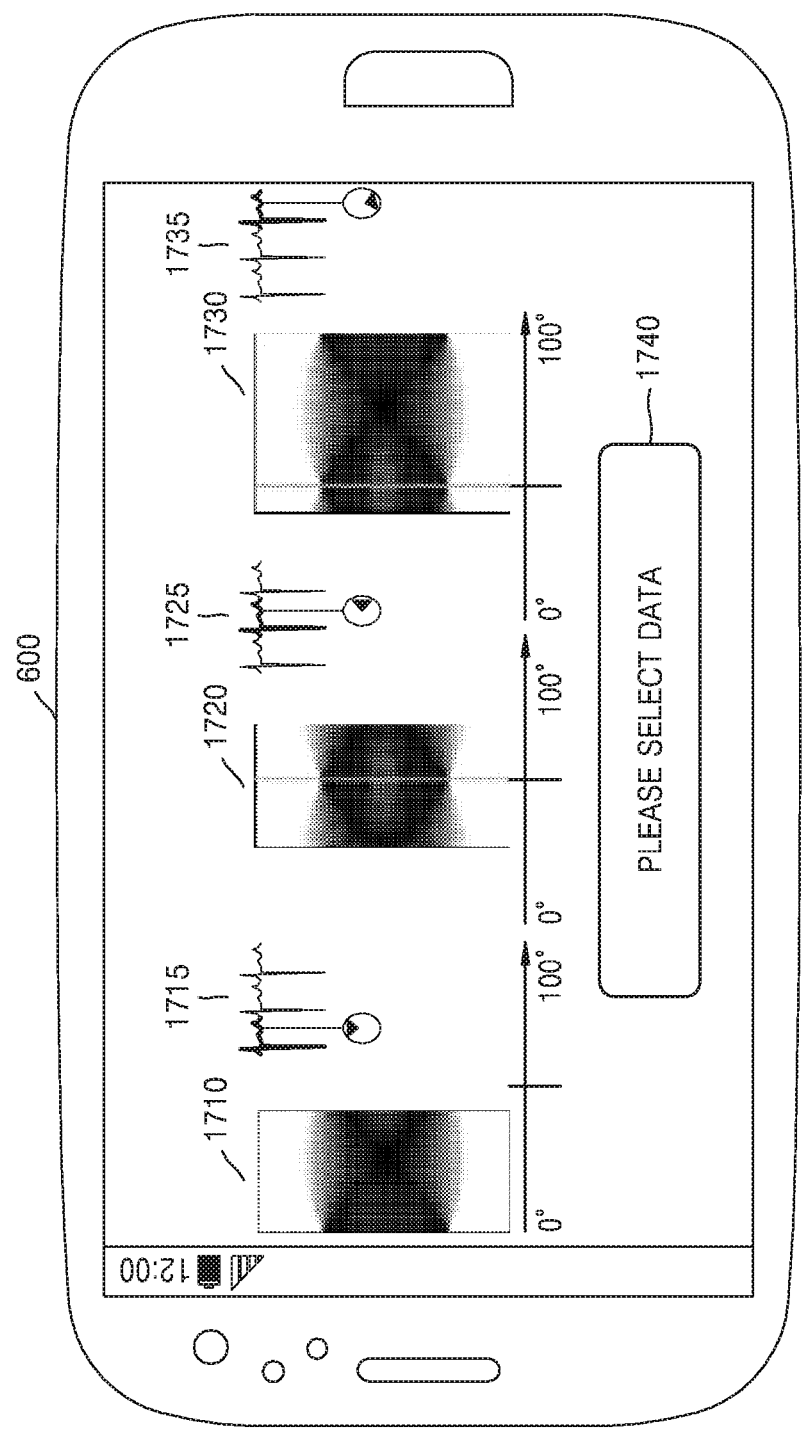
FIG. 17 illustrates a user interface provided to select projection data so that a diagnostic imaging apparatus according to an embodiment may acquire a reconstructed image of an object.

FIG. 17 illustrates a user interface provided to select projection data so that the diagnostic imaging apparatus 600 according to an embodiment may acquire a reconstructed image of an object.

Referring to FIG. 17, the user interface may display a first projection data 1710 of the object imaged in the first section of the first cycle, a second projection data 1720 of the object imaged in the second section of the second cycle, and a third projection data 1730 of the object imaged in the third section of the third cycle. Also, the user interface may display information 1715, 1725, and 1735 about a time section where each projection data is obtained, together with the first, second, and third projection data 1710, 1720, and 1730. Alternatively, the information 1715, 1725, and 1735 about the respective imaging time sections may be displayed with information about the angular sections where the projection data are imaged. The user may determine whether the sum of the sizes of the angular sections where the acquired at least one projection data is imaged exceeds 180° based on the displayed angular section information.

Alternatively, the user interface may display a request window 1740 that requests the user to select projection data to be used as a base for reconstructing an image of the object among the acquired projection data. The user may select at least one projection data that is determined to be suitable for reconstructing an image of the object by referring to the angular section where each projection data is imaged.

For example, when the angular section where the first projection data 1710 is imaged is from 330° to 45°, the angular section where the second projection data 1720 is imaged is from 40° to 135°, and the angular section where the third projection data 1730 is imaged is from 120° to 200°, the user may select the first projection data 1710, the second projection data 1720, and the third projection data 1730 through the user interface and acquire a plurality of images in which the sum of the imaging angular sections exceeds 180°.

According to the present embodiment, the user may select at least one projection data of the projection data displayed on the user interface by using an input device such as a mouse, a keyboard, etc. Alternatively, when the diagnostic imaging apparatus 600 includes a touch screen, the user may select at least one of the pieces of projection data displayed on the user interface by using a finger or a touch pen.

The embodiments of the disclosure may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While the disclosure has been particularly shown and described with reference to embodiments thereof, it will be understood by those of ordinary skill in the art that various changes in form and details may be made therein without departing from the spirit and scope of the disclosure as defined by the following claims. Accordingly, the above embodiments and all aspects thereof are examples only and are not limiting.

What is claimed is:

1. A diagnostic imaging apparatus comprising:
    an image acquirer configured to acquire first projection data obtained by imaging an object in a first section of a first cycle of the object having a first angular section less than 180° and second projection data obtained by imaging the object in a second section having a second angular section less than 180° corresponding to the first section which has the same position in a second cycle of the object as that of the first section of the first cycle of the object, wherein a first partial angular section included in the first angular section and a second partial angular section included in the second angular section are symmetrical or identical each other; and
    an image reconstructor configured to:
        extract first partial projection data corresponding to the first partial angular section and second partial projection data corresponding to the second partial angular section, respectively, from the first projection data and the second projection data, and
        reconstruct an image of the object based on a difference between the first partial projection data and the second partial projection data.

2. The diagnostic imaging apparatus of claim 1, wherein the image reconstructor changes at least one piece of projection data among the extracted projection data including the first partial projection data and second partial projection data.

3. The diagnostic imaging apparatus of claim 1, wherein the image acquirer acquires at least one piece of projection data obtained by imaging the object in each section corresponding to the first section of at least one other cycle, and
    the image reconstructor reconstructs an image of the object based on a difference among a plurality of pieces of projection data obtained by imaging the object.

4. The diagnostic imaging apparatus of claim 3, further comprising an input providing a user interface which enables selection of two or more pieces of projection data of the plurality of pieces of projection data,
    wherein the image reconstructor reconstructs an image of the object based on a difference between the two or more pieces of projection data selected by the user.

5. The diagnostic imaging apparatus of claim 4, wherein the user interface displays angular sections where the plurality of pieces of projection data are imaged, with the plurality of pieces of projection data.

6. The diagnostic imaging apparatus of claim 1, further comprising a display displaying a reconstructed image of the object.

7. The diagnostic imaging apparatus of claim 1, wherein the image reconstructor changes at least one piece of projection data of the first projection data and the second projection data based on a difference between the first partial projection data and the second partial projection data, and reconstructs an image of the object based on the changed at least one piece of projection data.

8. The diagnostic imaging apparatus of claim 1, wherein the image reconstructor changes at least one piece of projection data of the first projection data and the second projection data based on a difference between the first partial projection data and the second partial projection data, generates a first image and a second image reconstructed from the first projection data and the second projection data based on the changed at least one piece of projection data, and reconstructs an image of the object based on the first image and the second image.

9. A diagnostic imaging method comprising:
    acquiring a first projection data obtained by imaging an object in a first section of a first cycle of the object having a first angular section less than 180°;
    acquiring a second projection data obtained by imaging the object in a second section having a second angular section less than 180° corresponding to the first section which has a same position in a second cycle of the object as that of the first section of the first cycle of the object, wherein a first partial angular section included in the first angular section and a second partial angular section included in the second angular section are symmetrical or identical each other;
    extracting first partial projection data corresponding to the first partial angular section and second partial projection data corresponding to the second partial angular section, respectively, from the first projection data and the second projection data; and
    reconstructing an image of the object based on a difference between the first partial projection data and the second partial projection data.

10. The diagnostic imaging method of claim 9, wherein the reconstructing of the first projection data and the second projection data comprises:
    changing the other projection data based on any one projection data among the extracted projection data including the first partial projection data and second partial projection data.

11. The diagnostic imaging method of claim 9, further comprising:
    acquiring at least one projection data obtained by imaging the object in each section corresponding to the first section of at least one other cycle, and
    reconstructing an image of the object based on a difference among a plurality of pieces of projection data obtained by imaging the object.

12. The diagnostic imaging method of claim 11, further comprising:
    providing a user interface which enables selection of two or more pieces of projection data of the plurality of pieces of projection data; and
    reconstructing an image of the object based on a difference between two or more pieces of projection data selected by the user.

13. The diagnostic imaging method of claim 12, wherein the user interface displays angular sections where the plurality of pieces of projection data are imaged, with the plurality of pieces of projection data.

14. The diagnostic imaging method of claim 9, further comprising displaying a reconstructed image of the object.

15. The diagnostic imaging method of claim 9, wherein the reconstructing of the image of the object comprises:
   changing at least one piece of projection data of the first projection data and the second projection data based on a difference between the first partial projection data and the second partial projection data; and
   reconstructing the image of the object based on the changed at least one piece of projection data.

16. The diagnostic imaging method of claim 9, wherein the reconstructing of the image of the object comprises:
   changing at least one piece of projection data of the first projection data and the second projection data based on a difference between the first partial projection data and the second partial projection data;
   generating a first image and a second image reconstructed from the first projection data and the second projection data based on the changed at least one piece of projection data; and
   reconstructing the image of the object based on the first image and the second image.

\* \* \* \* \*